United States Patent [19]
Tanaka et al.

[11] Patent Number: 5,909,543
[45] Date of Patent: Jun. 1, 1999

[54] COMMUNICATION CONFERENCE SYSTEM AND COMMUNICATION CONFERENCE APPARATUS

[75] Inventors: Kenichiro Tanaka; Hiroaki Sato, both of Kawasaki; Hiroshi Okazaki, Yokohama; Kazuko Tsujimura, Kawasaki, all of Japan

[73] Assignee: Canon Kabushiki Kaisha, Tokyo, Japan

[21] Appl. No.: 08/564,873

[22] Filed: Nov. 28, 1995

[30]     Foreign Application Priority Data

Nov. 30, 1994  [JP]  Japan .................................. 6-296665
Nov. 30, 1994  [JP]  Japan .................................. 6-297628
Nov. 30, 1994  [JP]  Japan .................................. 6-297636

[51] Int. Cl.$^6$ ..................................................... H04N 1/42
[52] U.S. Cl. ........................ 395/200.34; 370/261; 348/15
[58] Field of Search ................................ 364/222.2, 919, 364/919.5; 395/200.34, 330; 370/260, 261; 348/15; 379/202–204, 158, 261, 93.21

[56]     References Cited

U.S. PATENT DOCUMENTS

| | | | |
|---|---|---|---|
| 4,710,917 | 12/1987 | Tompkins et al. .................. | 395/200.34 |
| 4,995,071 | 2/1991  | Weber et al. ............................. | 348/15 |
| 5,038,224 | 8/1991  | Martulli et al. .......................... | 358/446 |
| 5,315,633 | 5/1994  | Champa ..................................... | 348/16 |
| 5,422,883 | 6/1995  | Hauris et al. ............................ | 370/261 |
| 5,483,588 | 1/1996  | Eaton et al. ............................. | 379/202 |
| 5,572,582 | 11/1996 | Riddle ...................................... | 379/202 |
| 5,642,156 | 6/1997  | Saiki ........................................ | 348/15 |

FOREIGN PATENT DOCUMENTS

| | | |
|---|---|---|
| 410378 | 7/1990 | European Pat. Off. . |
| 574138 | 5/1993 | European Pat. Off. . |

OTHER PUBLICATIONS

Gajewska et al., Argo: A System for Distributed Collaboration, Proceedings of the ACM Multimedia '94 Conference, Oct. 1994.

"A testbed for multimedia groupware applications", C. Makepeach, et al., BT Technology Journal, Jul., 1994, No. 3, pp. 56–63.

"Personal Multimedia–Multi–Point Teleconference System", H. Tanigawa, et al., IEEE Infocom '91 Conference, vol. 3, Apr., 1991, pp. 1127–1134.

"Multipoint LAN Conferencing", D. Cobbley, Compcon Spring '93, Feb., 1993, pp. 502–506.

Mark Manasse, Publications of Mark Manasse, Internet Derwent, wan.research.digital.com/SRC/staff/msml/bib.html. Documents date of Gajewska et al., Apr. 22, 1998.

*Primary Examiner*—John Barlow
*Assistant Examiner*—Craig Steven Miller
*Attorney, Agent, or Firm*—Fitzpatrick, Cella, Harper & Scinto

[57]                 ABSTRACT

A terminal device which can set a connection status of a communication tool line between terminal devices in various ways and an electronic conference system having such a terminal device are provided. The terminal device for communicating information between remote terminal devices comprises a connection status operation/control unit for setting a connection status of a line to be used by the communication tool, a connection modification unit for changing the line connection in accordance with the content set by the connection status operation/control unit, a connection status modification convey unit for outputting the content set by the connection status operation/control unit to other terminal device, and a connection status modification inform unit for receiving the content of the modification of the line connection from the other terminal.

24 Claims, 24 Drawing Sheets

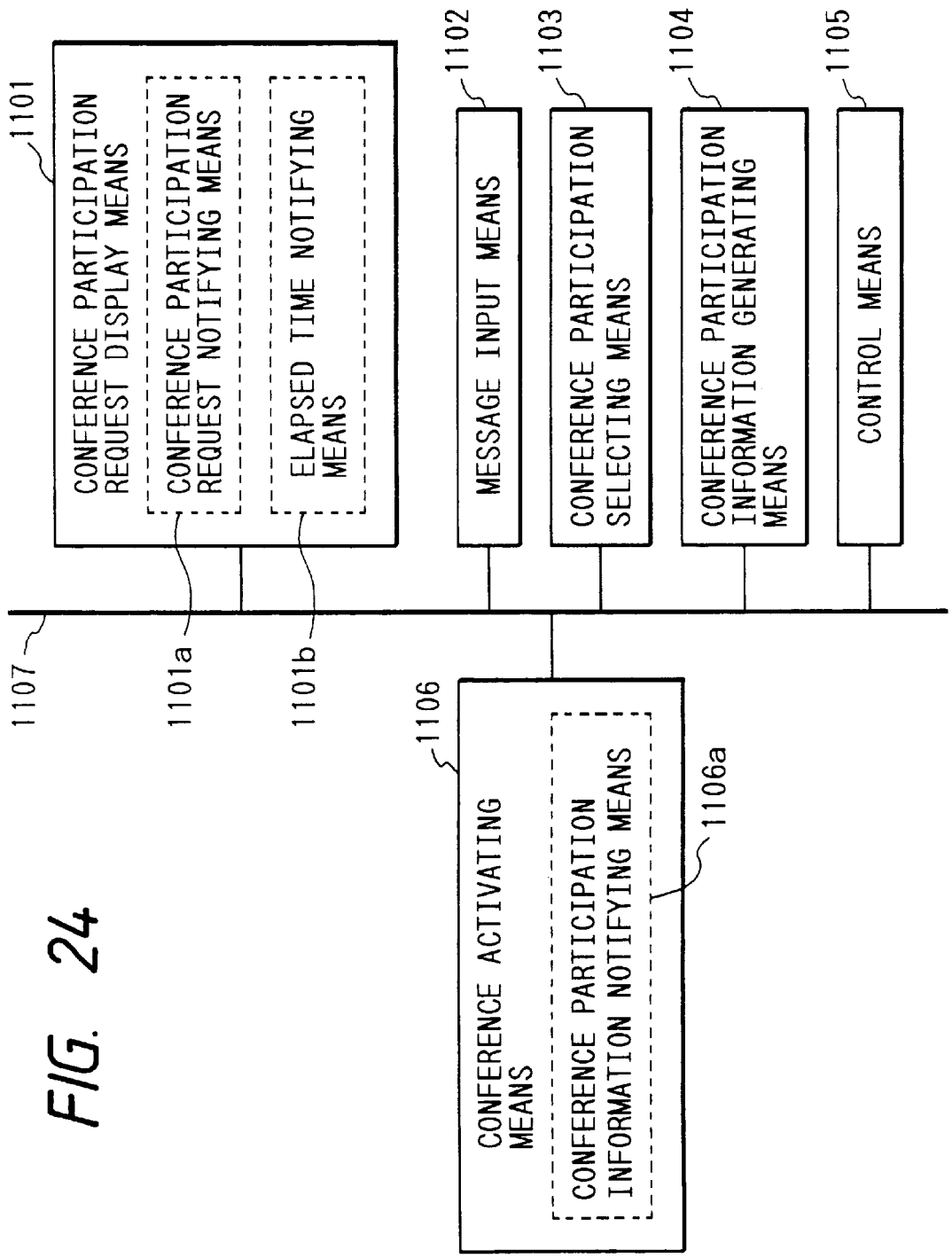

COMMUNICATION CONFERENCE SYSTEM AND COMMUNICATION CONFERENCE APPARATUS

BACKGROUND OF THE INVENTION

1. Field of the Invention

The present invention relates to communication conference system and communication conference apparatus.

2. Related Background Art

Types of actual conferences are classified in the following major classes:

(1) Presentation Type (see 4-2 in FIG. 4)

One presentor is present and all others are audience. For example, a lesson in a school belongs to this class.

In the presentation type conference, the presenter may speak to the audience but the audience is not allowed to speak to the presenter. However, in questions and answers, the audience may speak to the presentor.

(2) Discussion Type (see 4-1 in FIG. 4)

There is no distinction between the presenter and the audience and all members participating the conference are allowed to speak. Brainstorming and discussion belong to this class. In the discussion type conference, all participants of the conference are allowed to speak and speeches by all other participants may be listened to.

(3) Combination Type (see 4-3 in FIG. 4)

A combination of the types 4-1 and 4-2 in FIG. 4. Several participants make discussion and other participants are the audience. A panel discussion belongs to this class.

As described above, there are various types of actual conferences.

However, in the prior art electronic conference system, means for realizing such variety of electronic conferences is not established and means for changing the connection of the line by the participants is not provided. As a result, the conferences other than the discussion type conference (2) in which all participants are interconnected cannot be realized.

In an actual conference of the type (2), a secret communication (by which conversation is made only between neighbors) is frequently conducted.

However, in order to achieve the secret communication, it is necessary to provide a separate communication line in addition to a main conference communication line to start a new conference. However, this method requires to set a new conference. In addition, tools used in the main conference may not be used for the secret communication. When a microphone is used in the main conference, a voice tool may not be used in the secret communication.

As described above, since the prior art system supports only a simple form of line connection, it cannot fully attain the inherent object of the electronic conference system of "to replace an actual form of conference".

The actual conferences may be classified into a formal conference such as a regularly held conference and an informal conference such as discussion by free participants.

In the formal conference, a chairman has been predetermined and the participants are normally predetermined persons, and means such as an electronic black board and an OHP are essential to smoothly conduct the conference.

On the other hand, in the informal conference, the participants are not fixed and a chairman is normally not elected and the electronic black board or OHP is not always required.

However, in the prior art electronic conference system, whatever type of electronic conference may be initiated, only one fixed user interface is provided to set an environment to start the conference.

As a result, even when the formal conference (which uses the same tools such as shared window tools, shared documents tools, voice tools and video tools by the same participants at every conference) is started, the same items must be set every time as the environment setting for the electronic conference and hence a big workload is required to start the conference. When the informal conference is to be started, the election of the chairman and the setting of the conference described above are in many cases not necessary, but such unnecessary items must be set. Thus, a big workload is required to start the conference.

It is considered that the electronic conference will become more and more versatile and the numbed of items to be set when the electronic conference is to be started will increase in the future. In such a case, if it is required to designate all necessary items to start the conference each time the electronic conference is to be started, a very troublesome work is required, which cannot be ignored.

In a common conference, a start time of the conference has been previously provided to the participants of the conference, and even if a participant is late to the conference, he may grasp how much time has elapsed since the start of the conference.

When a participant cannot attend the conference or will be late, it is common to provide notice to the chairman or participant of the conference a reason for absence or when he will come.

However, in the prior art electronic conference system, an invitee cannot immediately determine the elapsed time from the occurrence of the request to participate in the conference.

The participant (invitee) of the conference can convey only the information of participation or non-participation to the inviter (person who attempts to start the electronic conference) and the information which can be conveyed is extremely small.

Accordingly, when the invitee cannot participate in the conference, he cannot convey the reason for the non-participation or request a call in the course of conference because he is now busy on another work but may participate in the conference a few minutes later.

SUMMARY OF THE INVENTION

It is an object of the present invention to provide an electronic conference system and an electronic conference apparatus which solve the above problems.

It is another object of the present invention to provide a communication conference system and a communication conference apparatus which can attain a similar environment to that of a conventional conference.

It is another object of the present invention to provide a communication conference system and a communication conference apparatus which can support various types of conferences.

In order to achieve the above objects, in accordance with a preferred embodiment of the present invention, there is provided a communication conference apparatus comprising setting means for setting a direction of communication independently for each of other communication conference apparatus participating in a communication conference, and connection means for connecting lines in accordance with the direction of communication determined by said setting means.

It is another object of the present invention to provide a communication conference system and a communication conference apparatus which facilitates the setting of a conference environment by changing an interface for setting the conference environment in accordance with the type of conference.

It is another object of the present invention to provide a communication conference system and a communication conference apparatus which allows smooth late participation in the conference in an environment in which an invitee participates in the conference in the course of the conference.

It is another object of the present invention to provide a communication conference system and a communication conference apparatus which have new functions.

Other objects and features of the present invention will be apparent from the following detailed description of the invention and the accompanying drawings.

BRIEF DESCRIPTION OF THE DRAWINGS

FIG. 24 shows an example of the electronic conference system in the fifth embodiment and a functional block diagram of components thereof;

DETAILED DESCRIPTION OF THE PREFERRED EMBODIMENTS

First Embodiment

Figure 1:
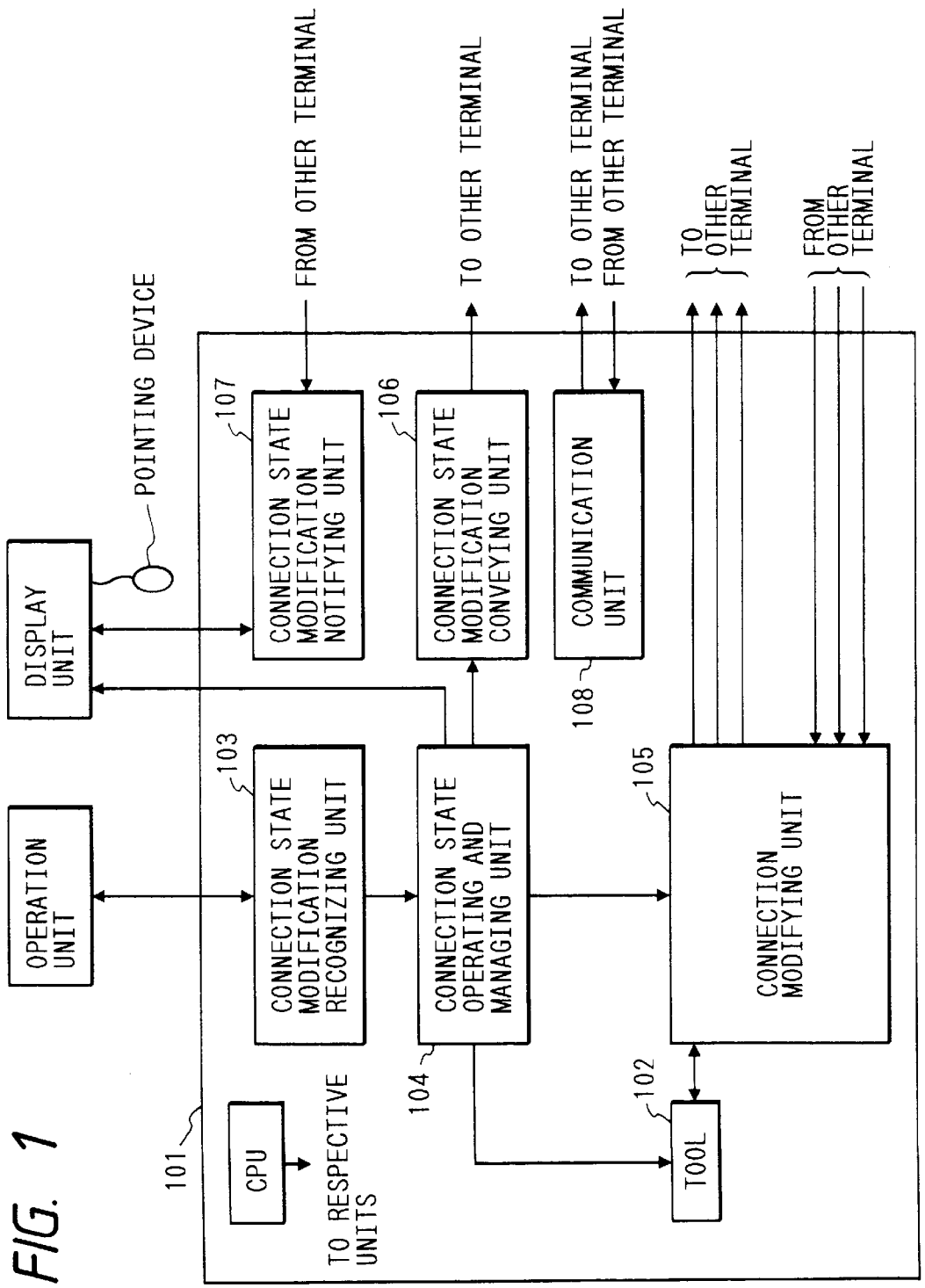
FIG. 1 shows a block diagram of a configuration of an electronic conference system in accordance with an embodiment of the present invention.

FIG. 1 shows a block diagram of a configuration of a terminal device of an electronic conference system in accordance with a first embodiment of the present invention.

In FIG. 1, numeral 101 denotes a terminal in the electronic conference system. The electronic (communication) conference system is operated under control of a CPU of FIG. 1.

Numeral 102 denotes various tools such as a video tool for inputting and outputting video, an audio tool for inputting and outputting audio, a character communication tool for inputting and outputting character information and a shared draw tool for a shared draw, numeral 103 denotes a connection status modification recognition unit for recognizing a modification request for a line connection status from a user inputted by using a console unit, not shown, numeral 104 denotes a connection status operation/control unit for commanding a modification of the connection status to a connection status modification unit 105, and numeral 105 denotes the connection status modification unit for changing the connection to connect the inputs/outputs of the tools to other conference participant terminals as commanded by the connection status operation/control unit 104. When there are two or more destination stations, data such as user audio input, video input and picture are duplicated and transmitted to the respective destination stations.

Numeral 106 denotes a connection modification transmission unit to indicate the transmission to the modified destination station when the modification of the destination station of the data is commanded by the connection status operation/control unit 104.

Numeral 107 denotes a connection status modification notifying unit for inputting information indicating that the terminal is switched from another terminal as the destination station, or that the terminal is no longer the destination station. Namely, it is an input unit to input information on which user has requested a connection request and what tool has been used therefor.

Numeral 108 denotes a communication unit for communicating in the determined connection status by using the determined tools.

Figure 5:
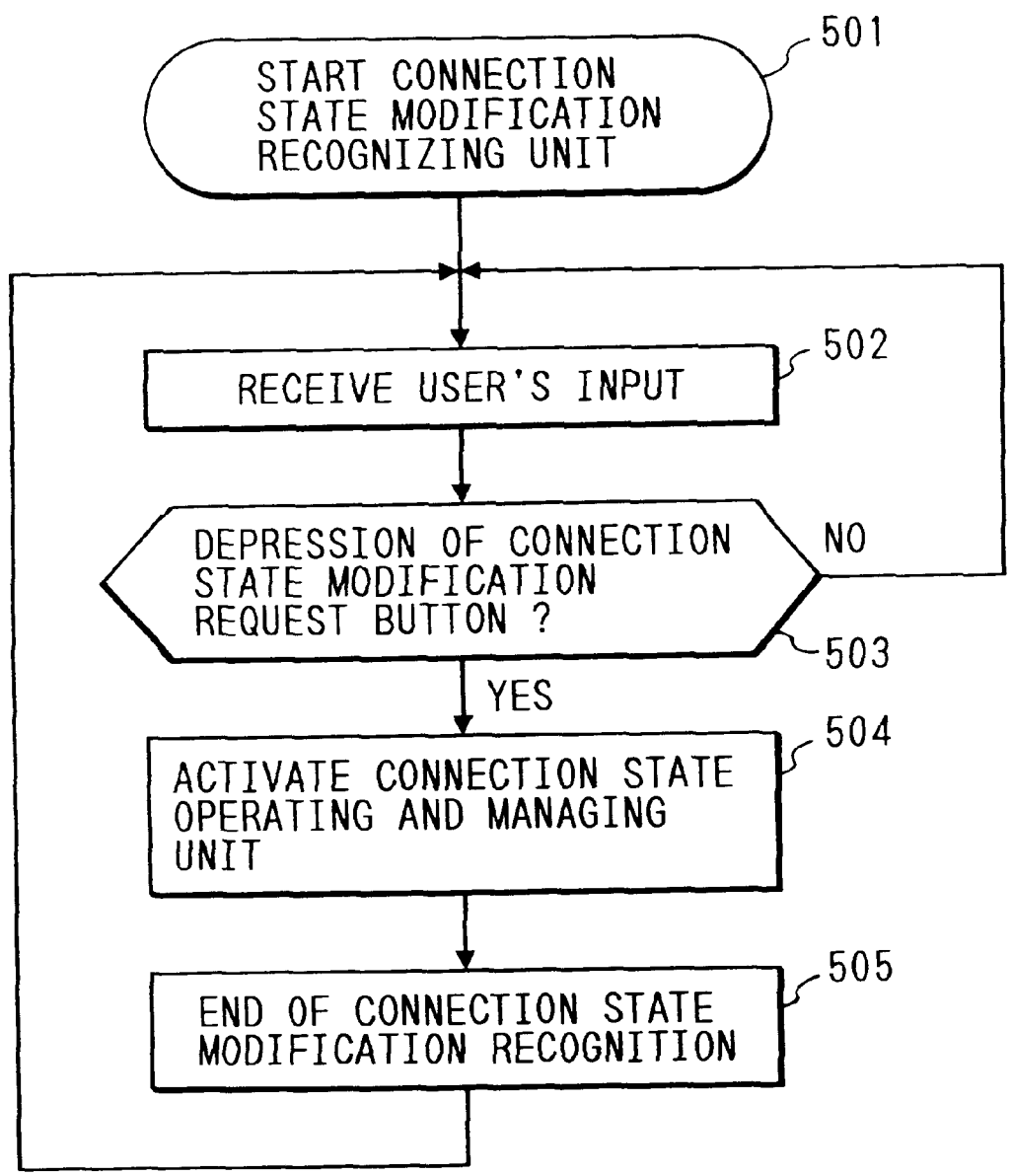
FIG. 5 shows a flow chart of a process of a connection status modification request unit 103.
Figure 6:
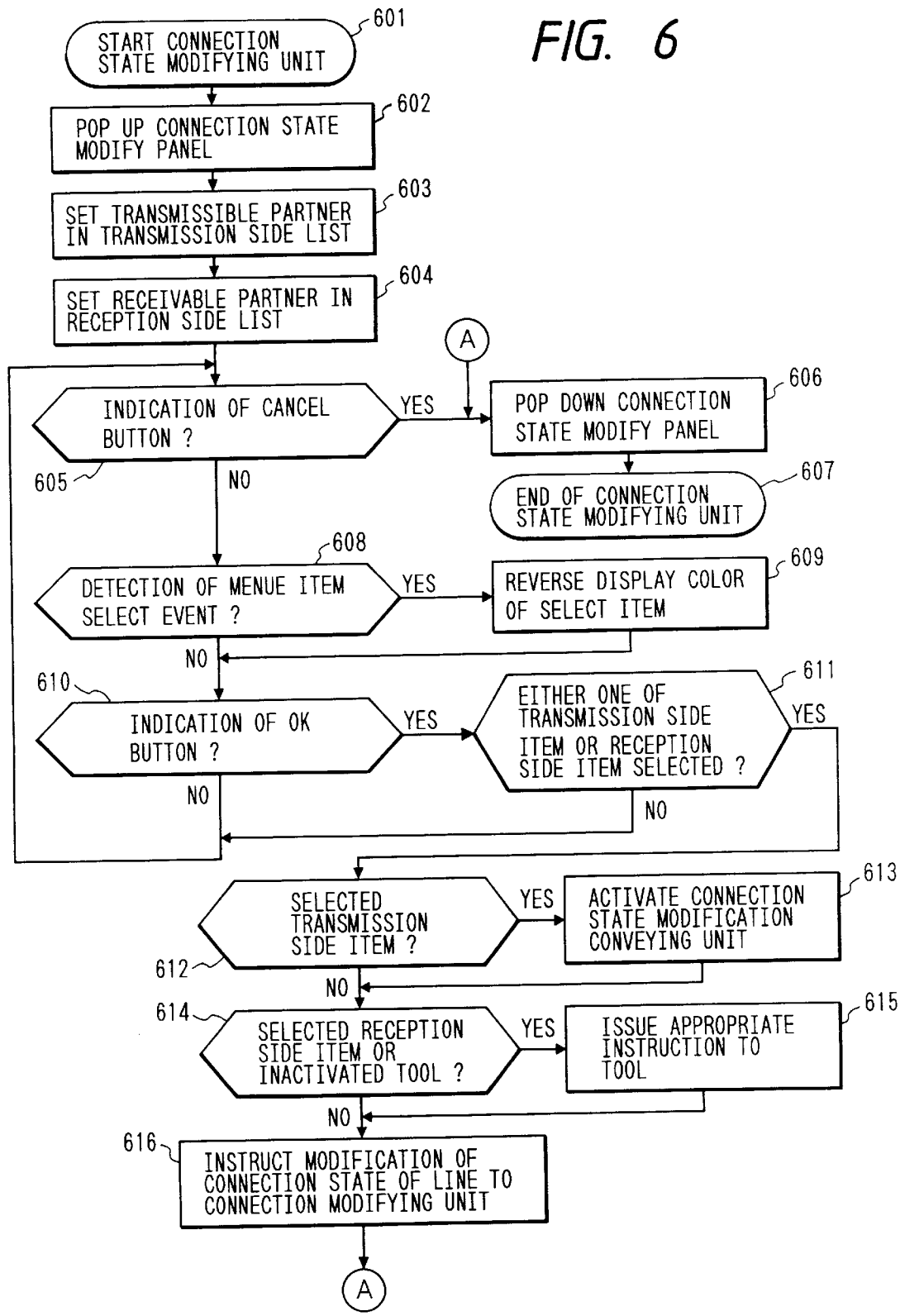
FIG. 6 shows a flow chart of a process of a connection status operation/control unit 104.

Referring now to FIGS. 5 and 6, an operation process of the present embodiment is explained.

FIG. 5 shows a flow chart of an operation of the connection status modification recognition unit 103.

In FIG. 5, at the start-up of the terminal, the connection status modification recognition unit 103 is started up (501). In a step 502, a user input is received. In a step 503, the user input is examined and when the user input is the depression of a connection status request button in the console unit of FIG. 1, the process proceeds to a step 504 to starts up the connection status operation/control unit 104. The connection status modification recognition unit then stands by.

On the other hand, when the user input is not the depression of the connection status modification request button in the step 503, the process proceeds to a step 505 and the connection status recognition unit 103 stands by.

FIG. 6 shows a flow chart of an operation of the connection status operation/control unit 104.

In FIG. 6, the connection status operation/control unit 104 started up in response to the recognition by the connection status modification recognition unit 103 starts up the connection status modification unit 106 (601) and then pops up the connection status modification panel on the display unit of FIG. 1 in a step 602.

Figure 10A:
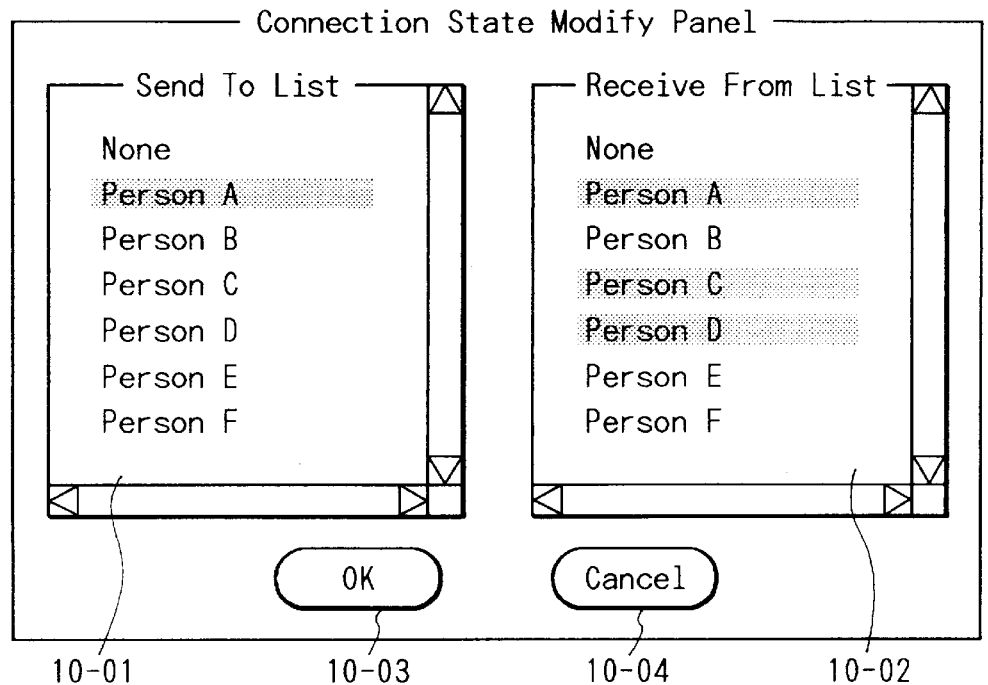
FIGS. 10A and 10B show specific views of a connection status modification panel.
Figure 10B:
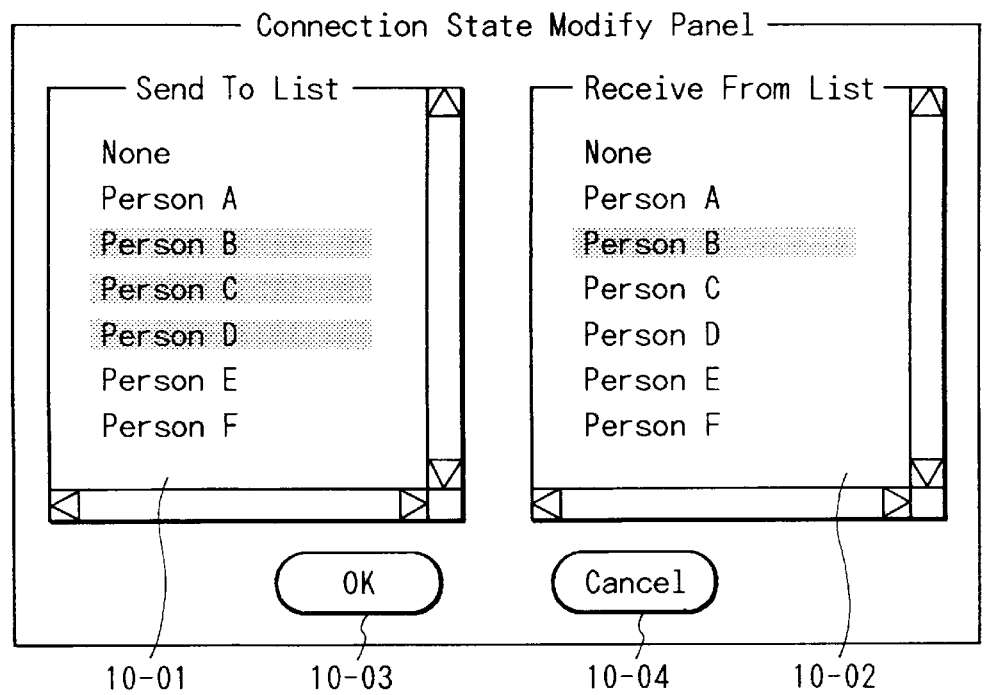

An example of the connection status panel is shown in FIGS. 10A and 10B.

In FIGS. 10A and 10B, numeral 10-01 denotes a data transmission destination list which lists destination terminal devices to which data is to be transmitted from its own terminal device. Numeral 10-02 denotes a data sender list which lists terminal devices from which data are transmitted to its own terminal device. Selected items of those lists are inversion-displayed. In the example of FIG. 10A, Person A is designated as a data transmission destination,and Person C, Person B and Person C are designated as data sender terminal devices, Numeral 10-03 denotes an OK button which is activated by a pointing device such as a mouse to indicate when the selection of the destination stations and the sender stations is completed, and numeral 10-04 denotes a button to stop the modification of the connection status, that is, a cancel button activated by the pointing device.

Turning back to FIG. 6, after the connection status modification panel has been popped up, the participants of the electronic conference are set in the destination list 10-01 in a step 603 and they are set in the sender list 10-02 in a step 604. In a step 605, the activation of the cancel button 10-04 is examined, and if it has been activated, the process proceeds to a step 607 to pop down the connection status modification panel. In a step 607, the process of the connection status operation/control unit 104 is terminated.

On the other hand, if it is determined in the stem 605 that the cancel button 10-04 has not been activated, the presence or absence of an event to select a list item is examined in a step 608. When the event to select the list item is detected, the process proceeds to a-step 609 to display the selected item in an inverted display color to indicate a selected state.

On the other hand, if the event to select the list item is not detected in the step 608, the process proceeds to a step 610 to determine whether the OK button 10-03 has been activated or not. If it has not been activated, the process returns to the step 605.

On the other hand, when it is determined that the OK button 10-03 was activated in the step 610, whether either of the destination item or the sender item has been selected or not is determined in a step 611. If no item has been selected, the modification of the connection status is not permitted and the process returns to the step 605.

If at least one of the items has been selected in the step 611, whether the destination item has been selected or not is determined in a step 612. If it has been selected, a command is issued to the connection status modification transmission unit 106 in a step 613 to indicate to the terminal device of the selected item "the start of data transmission".

If it is determined in the step 612 that the destination item has not been selected, or when the step 613 is over, whether the sender item has been selected or not, or whether the tool is activated or not is determined in a step 614. If the sender item has been selected, it may be necessary to increase the input line for the tool, and if the tool is not activated at the communication start time, it is necessary to activate the tool. Those processes are conducted in a step 615.

If it is determined in the step 614 that the sender item has not been selected or when the step 615 is over, a command is issued to the connection modification unit 105 in a step 616 to modify the connection status of the line.

The connection modification unit 105 connects the output of the tool to the line to the data destination and connects the data from the sender to the input to the tool. When there are a plurality of data destinations, the tool outputs are duplicated and transmitted.

In a step 606, the connection status modification panel is popped down and the process of the connection status operation/control unit 104 is terminated.

In the example shown in FIG. 10A, when the OK button 10-03 is activated, the data is transmitted to only the Person A for all tools which its own terminal device uses and the data are received from the Person A, Person C and Person D. For example, when the audio tool and the video tool are used, the status of the line may be modified so that the Person A can transmit the information to only its own terminal device to attain the so-called secret communication (see 4-4 in FIG. 4), in which the communication is made only between the Person A and its own terminal (terminal B) while the Person A can listen the speech of others.

Figure 4:
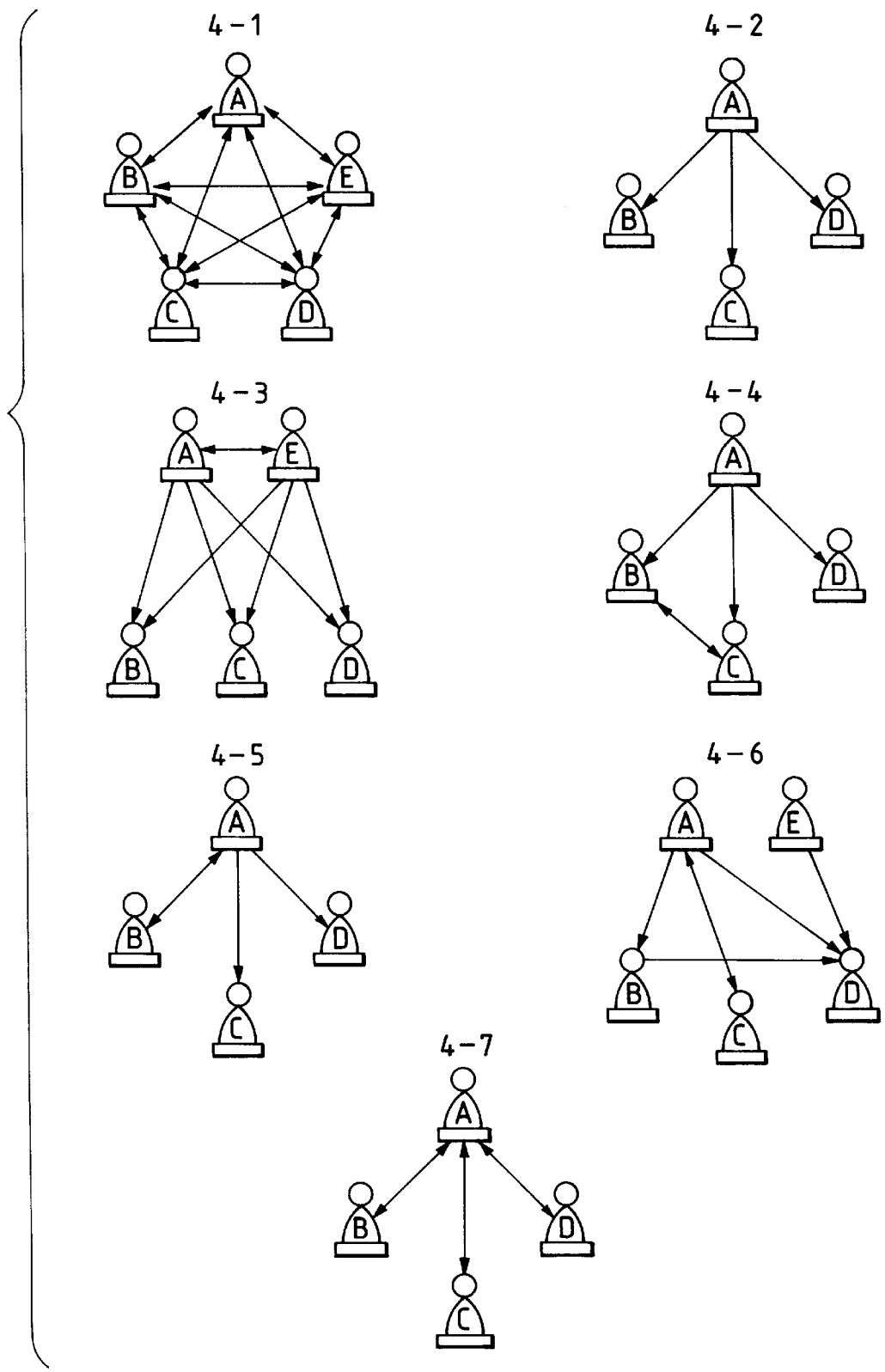
FIG. 4 illustrates various type of conferences.

In the example shown in FIG. 10B, the conference type of 4-5 in FIG. 4, that is, the questions and answers in the presentation are permitted (the own terminal is A).

In order to attain the presentation type of 4-2 in FIG. 4, all other terminal devices are selected in the destination list and none of the terminal devices in the sender list is selected.

In order to attain the panel discussion type of 4-3 in FIG.4, in the destination lists of the two terminals A and E between which the discussion is made, the terminal A selects B to E and the terminal E selects A to D, and in the sender lists, the terminal A selects the terminal E and the terminal E selects the terminal A.

In accordance with the first embodiment, since the destinations and the senders of the tools which its own terminal uses may be set at the start of the communication or modified during the communication, more versatile types of communication may be attained than that attained by the prior art system in which all terminal devices are interconnected.

Further, since unnecessary data is not transmitted, the transmission cost is reduced.

Further, a one-to-one conference, a temporary conference by a sub-group of the participants and a conference by the interconnection of all participants are attained and the configuration may be modified during the conference.

Further, the simultaneous participation in a plurality of conferences (as shown by 4-7 in FIG. 4) is attained by selecting the terminals B to E by the terminal A in the destination list and selecting the terminals B to E in the sender list.

Second Embodiment

In a second embodiment, in order to modify the line connection status for each tool, a tool selection unit 201, a plurality of connection modification units 105-1 to 105-n and a plurality of tools 102-1 to 102-n are provided.

Figure 2:
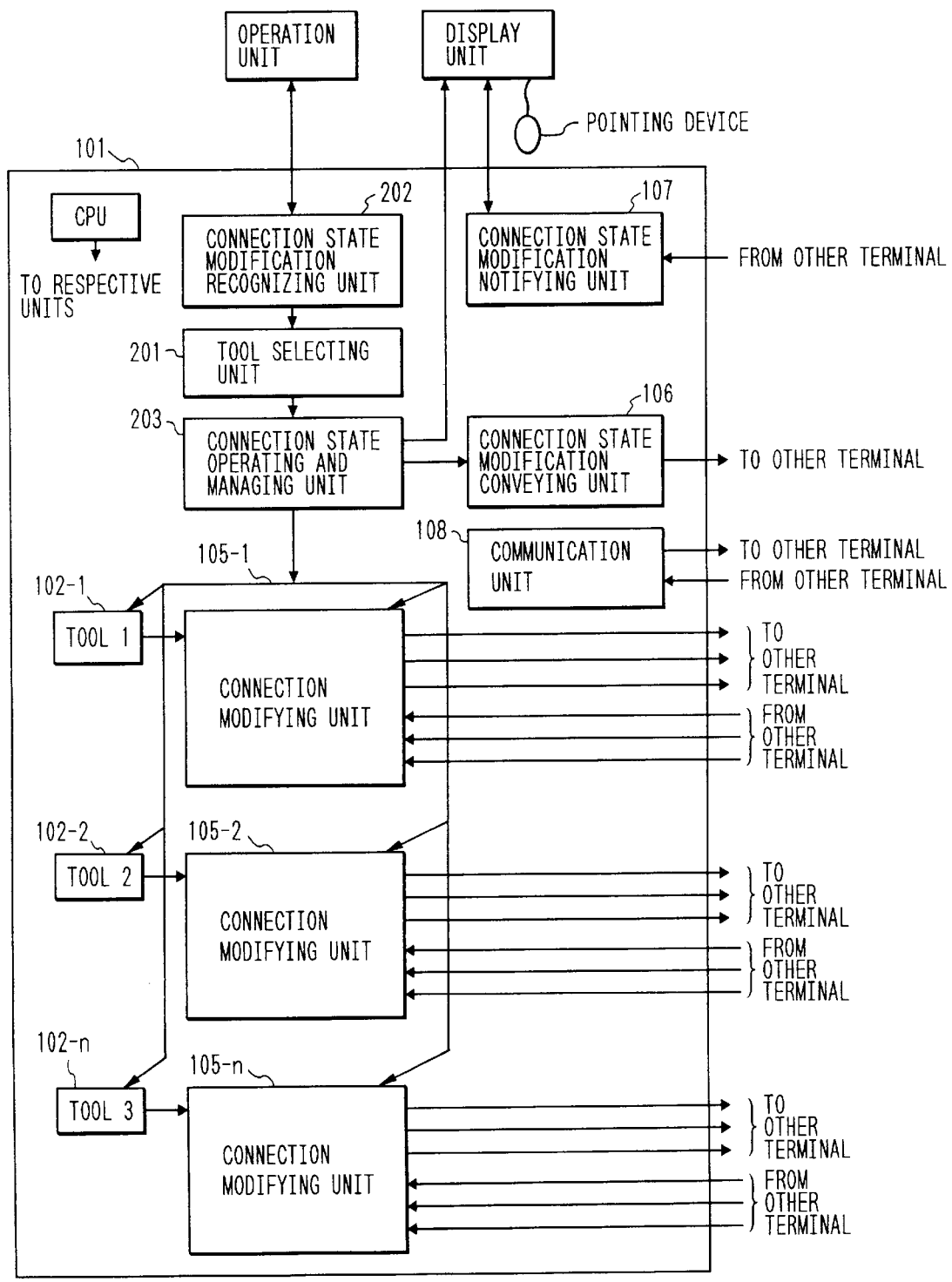
FIG. 2 shows a block diagram of a configuration of an electronic conference system having a tool selection unit in accordance with a second embodiment of the present invention.

FIG. 2 shows a block diagram of an electronic conference system having the tool selection unit in accordance with the second embodiment.

In FIG. 2, numeral 201 denotes a tool selection unit for selecting a tool for which the line connection status is to be modified. The tool selection unit 201 can select a plurality of tools. Namely, when the connection status of the audio tool and the shared text tool is to be simultaneously modified, the tool selection unit selects the audio tool and the shared text tool.

Figure 7:
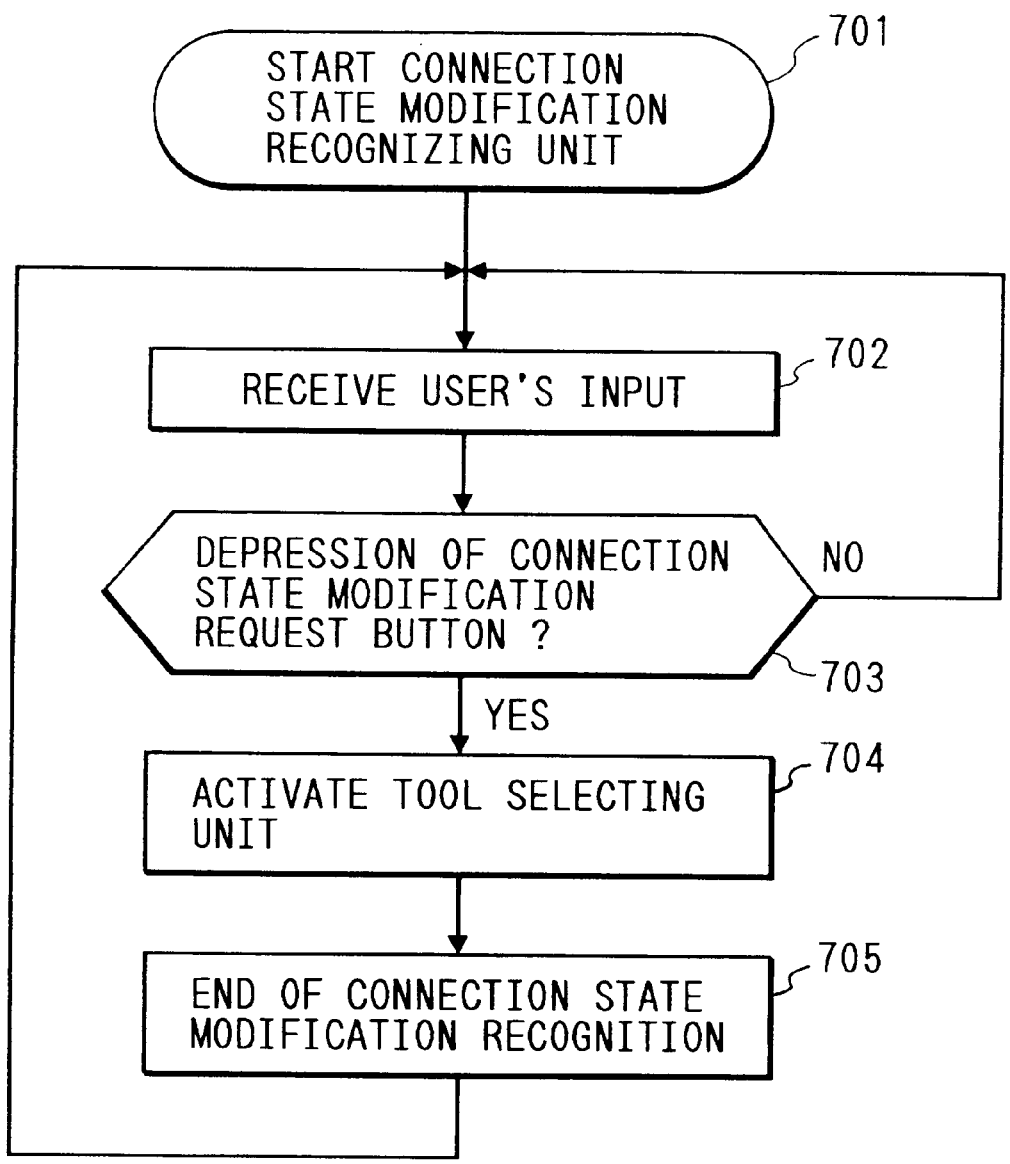
FIG. 7 shows a flow chart of a process of a connection status modification request unit 203.
Figure 8:
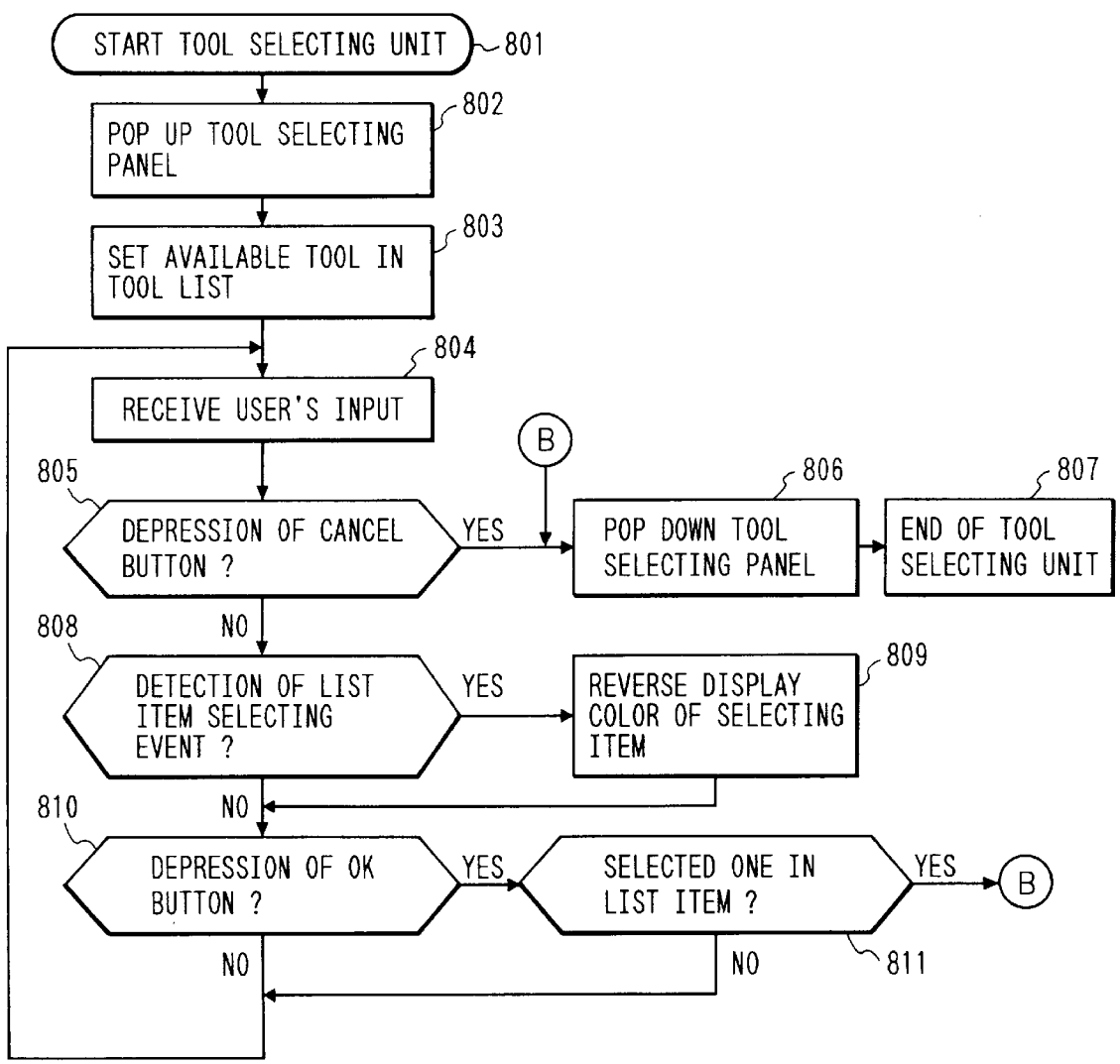
FIG. 8 shows a process of a tool selection unit 201.

Referring to FIGS. 7 and 8, an operation process of the present embodiment is explained.

FIG. 7 shows a flow chart of an operation of the connection status modification recognition unit 202.

In FIG. 2, at the start-up of the terminal device, the connection status recognition unit is started up (701). In a step 702, a user input is received. In a step 703, the user input is examined, and if the user input is the depression of the connection status modification request button in the console unit in FIG. 2, the process proceeds to a step 704.

In the step 704, the tool selection unit 201 is started up to designate the tool for which the connection status is to be modified. If the user input is not the depression of the connection status modification request button in the step 703, the process proceeds to a step 705 and the connection status modification recognition unit 202 stands by.

FIG. 8 shows a flow chart of an operation of the tool selection unit 201.

The tool selection unit 201 follows the following operation sequence. First, in a step 802, the tool selection panel is popped up on the display unit of FIG. 2.

Figure 9:
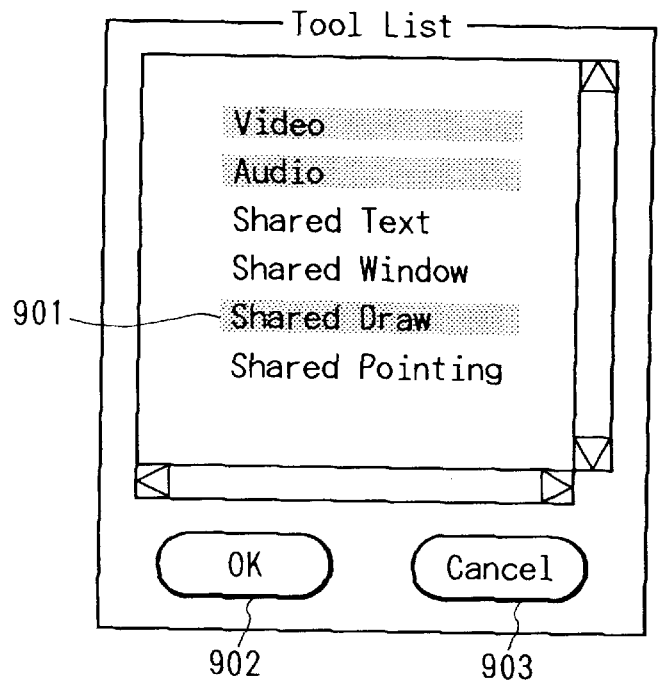
FIG. 9 shows a specific view of a tool selection panel.

An example of the tool selection panel is shown in FIG. 9.

In FIG. 9, numeral 901 denotes a list of tools which may be used in the electronic conference in the present embodiment, and the selected items are inversion-displayed. Numeral 902 denotes an OK button which is depressed when the tool selection is completed, and numeral 903 denotes a cancel button to stop the tool selection in the course of selection. In the present embodiment, the selection of the item and the pointing of the OK button and the cancel button are conducted by the pointing by the pointing device.

Turning back to the flow chart of FIG. 8, in a step 803, a list of tools usable in the electronic conference system is set to the list 901 of the tool selection panel. In a step 804, a user input is received. In a step 805, whether the user input is the activating of the cancel button 903 by the user or not is determined, and if it is the activating of the cancel button 903, the process proceeds to a step 806.

In the step 806, the tool selection panel is popped down, and in a step 807, the selection process by the tool selection unit 201 is terminated.

On the other hand, if the user input is not the activating of the cancel button in the step 805, the process proceeds to a step 808. In the step 808, whether the user input is the selection of the list item or not is determined, and if it is the selection of the user item, the process proceeds to a step 809, and if it is not the selection of the list item, the process proceeds to a step 810.

In the step 809, the display color of the selection item is inverted to indicate that the item has been selected.

In the step 810, whether the user input is the activating of the OK button or not is determined, and if it is not the activating of the OK button 902, the process returns to the step 804.

On the other hand, if it is the activating of the OK button in the step 810, the process proceeds to a step 811. In the step 811, whether any of the list items has been selected or not is determined. If there is no selected list item, the process returns to the step 804 to select the tool line connection status and waits for the list item select event.

On the other hand, when any of the tool lists has been selected in the step 811, the connection status operation/control unit 203 is started up in a step 812.

The connection status operation/control unit 203 is basically identical to the status operation/control unit 104 of the first embodiment except that the modification of the connection status is requested to the tool or the set of tools by the status operation/control unit 104 of the first embodiment while the connection modification is made to only the tool selected by the tool selection unit 201 in the second embodiment. In the step 806, the tool selection panel is popped down and the tool selection process is terminated.

In accordance with the second embodiment of the present invention, since the communication tool for which the line connection status is to be modified can be designated, more versatile types of communication may be attained. Namely, the modification of the line connection state attained in the first embodiment can be attained for each tool.

For example, when the electronic conference system is implemented by using the audio tool, the video tool, the character communication tool and the shared draw tool and the tool selection means is introduced in accordance with the second embodiment, the setting in which only the specified person (Person A) can conduct the secret communication by using the character communication tool while conducting the communication with all participants of the conference by using the audio tool and the video tool, and the consultation by specified persons (Person B and Person C) is permitted by using the shared draw tool can be readily attained.

Third Embodiment

Figure 3:
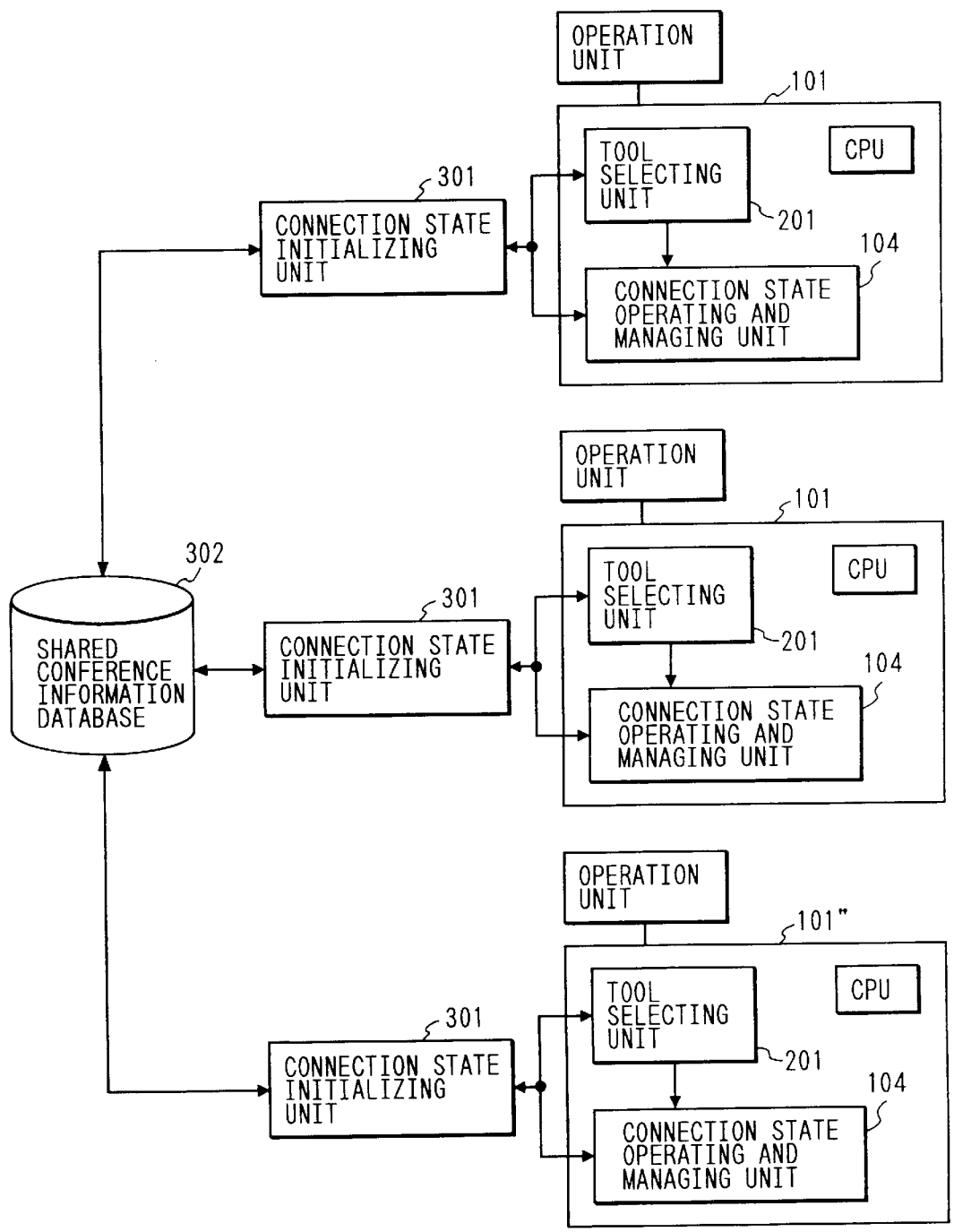
FIG. 3 shows a block diagram of a configuration of an electronic conference system having a connection status initial setting unit in accordance with a third embodiment of the present invention.

FIG. 3 shows a block diagram of a configuration of an electronic conference system having a connection status initial setting unit in accordance with a third embodiment. In FIG. 3, the same elements as those in FIGS. 1 and 2 are designated by like numerals and the explanation thereof is omitted. Numerals 101' and 101" denote other terminal devices having the same function as the terminal device 101.

In FIG. 3, numeral 301 denotes a connection status initial setting unit for automatically setting tools to be used and the line connection status of the respective tools by designating a conference name when the conference name, configuration, participants, tools to be used and a chairman have been determined at the start of the conference.

For example, when a presentation is to be held, the initial settings may differ from participant to participant. The presenter transmits the outputs of the tools which are to be used to all participants but the audience need set only the receiving line between the terminal device of the presenter and its own terminal device. Instead of the setting by each participant, a command is issued to the tool selection unit 201 and the connection status operation/control unit 104 to automatically set them at the start of the conference by the connection status initial setting unit 301.

Numeral 302 denotes a shared conference information database which manages the information on the conference. An example of the information managed by the shared conference database 302 is shown in FIG. 13.

Figure 13:
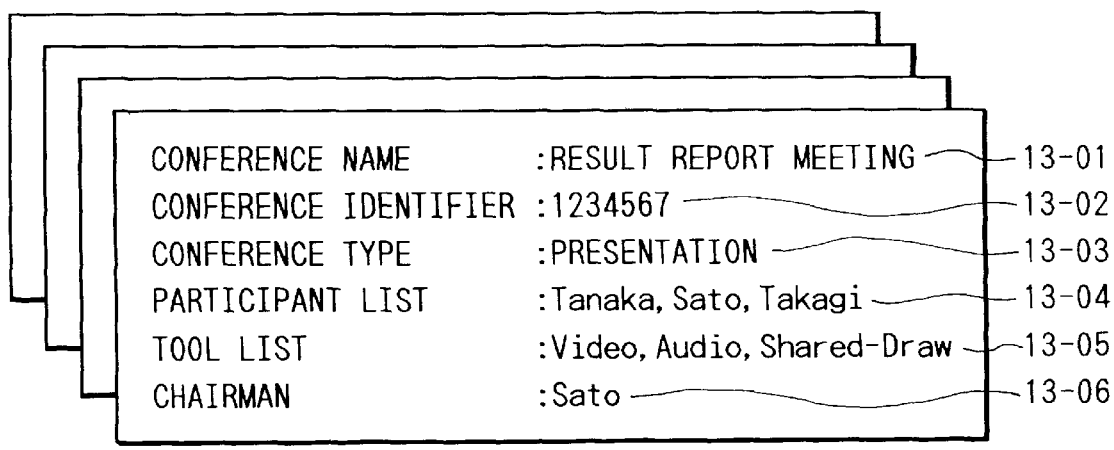
FIG. 13 shows a specific example of data managed by a shared conference information database 302.

In FIG. 13, numeral 13-01 denotes a conference name, numeral 13-02 denotes a conference identifier, numeral 13-03 denotes a conference type, numeral 13-04 denotes a participant list, numeral 13-05 denotes a list of tools to be used in the conference and numeral 13-06 denotes a name of chairman of the conference.

The conference type includes presentation, discussion, questions and answers and general conference information, and the types of conferences as shown in FIG. 4 are supported. The connection status of the line is determined by the conference type.

An operation process of the present embodiment is now explained.

At the start of the conference, the user starts up the connection status initial setting unit 301. The user inputs the conference name. The input user name is transmitted to the connection status initial setting unit 301 of the electronic conference system 101 and converted to a conference identifier by the CPU. The connection status setting unit 301 accesses the shared conference information database to retrieve the information in accordance with the conference identifier corresponding to the conference designated by the user. When the information on the user designated conference is retrieved, a command is issued to the tool selection unit 201 and the connection status operation/control unit 104 in accordance with the information.

For example, it is assumed that a conference set as shown in FIG. 13 is to be held.

Since the conference type is presentation, a unidirectional line is installed for each of the tools described in the tool list from the presenter to the audience. If its own person and the person described in the chairman column are equal, it means that its own person is the chairman and the setting is made by the connection status operation/control unit 104 such that all tools in the tool list are selected by the tool selection unit 201 and all terminal devices described in the participants are designated as the destinations and no sender is included.

If its own person and the person described in the chairman column are not equal, it means that its own person is an audience and the setting is made by the connection status operation/control unit 104 such that all tools in the tool list are selected by the selection unit, the sender is designated to the person described in the chairman column and no destination is included.

The secret communication may be readily attained in the electronic conference system of FIG. 3 by providing a secret communication setting unit in the console unit (see 4-4 in FIG. 4).

By starting up the secret communication setting unit by the console unit, not shown, the tool selection unit 201 and the connection status operation/control unit 104 are started up and the output of the selected tool may be limited to a specified one of the participants to attain the secret communication during the conference.

The setting operation of the secret communication is now explained.

First, as described above, the shared conference information database 302 is accessed to retrieve the information on the conference in which the user participates. The tool used in the conference is set in the tool list 901 (see FIG. 9) of the tool selection unit 201 and a default tool is inversion-displayed to indicate the selected state. It is assumed that the default tool is contained in the conference information. Namely, when the user uses the default tool for the secret communication, he does not need to specify the tool but needs only to activate the OK button on the tool selection panel. After the tool to be used is determined, the user specifies from the console unit the destination of the secret communication by using the connection status operation/control unit 104. A plurality of destinations may be specified.

By providing an interactive presentation setting unit in the electronic conference system of FIG. 3, the interactive presentation communication may be readily attained (see 4-5 in FIG. 4).

The interactive presentation is now explained.

An interactive presentation setting unit is provided in the console unit of FIG. 3. As the user starts up the interactive presentation setting unit, the tool setting unit 201 and the connection status operation/control unit 104 are started up, and the output of the tool selected by the tool selection unit 201 is transmitted to the presenter terminal device to allow questions and proposals to the presentor during the presentation.

A setting operation of the interactive presentation is now explained.

First, the shared conference information database 302 is accessed to retrieve the information of the conference in which the user participates. The tool used in the conference is set in the tool list 901 of the tool selection unit 201 and a default tool is inversion-displayed to indicate the selected state. It is assumed that the default tool is contained in the conference information. After the tool to be used is determined, the connection status operation/control unit 104 is started up and the participants of the conference are set in the destination list and the sender list. The list items are inversion-displayed such that the destination is the chairman terminal device and the sender is its own terminal device. Namely, when the default tool is used, the interactive presentation communication may be started by merely pointing the OK button of the tool selection panel and the connection status modification panel.

In accordance with the third embodiment of the present invention, when the communication is started, the setting of the tool to be used and the setting of the line connection status in accordance with the type of conference to be started are automatically set.

For example, when the present system is applied to the electronic conference system, the tool may be set by merely designating the conference to be started by the participant through the console unit and the line connection status is automatically set in accordance with the type of conference. Namely, when the type of conference is the presentation and if its own person is an audience, the setting is made to receive the data from the presentor, and if its own person is the presenter, the setting is made to transmit the data to all audiences. If the conference is the discussion, the setting is automatically made to interconnect the lines among the participants.

Various types of communication such as the secret communication (see 4-4 in FIG. 4) and the interactive presentation (see 4-5 in FIG. 4) can be readily attained. The actual secret communication is limited among the participants who are geographically close to each other but the use of the terminal device of the present invention eliminates such geographical limitation of the secret communication. In addition, since the destination may be designated for each tool in the secret communication, the secret communication by the characters may be newly conducted while the communication by audio and video is maintained.

Since it is possible to allow the reception by only the specified terminal device, the interactive presentation is attained by using the present apparatus. By specifying the destination to the presentor by the character communication, the questions and advice to the presentor may be permitted during the presentation. Since the presenter may proceed the presentation while he grasps the opinions of the audiences, the presentation with closer relation between the presentor or and the audiences may be attained.

Fourth Embodiment

In the second embodiment, not only the individual tool names but also a tool set name are contained in the list items on the tool panel 901 (see FIG. 9) of the tool selection unit 201. As a result, when the same tool set is used every time, the need to designate the individual tools is eliminated.

Figure 11:
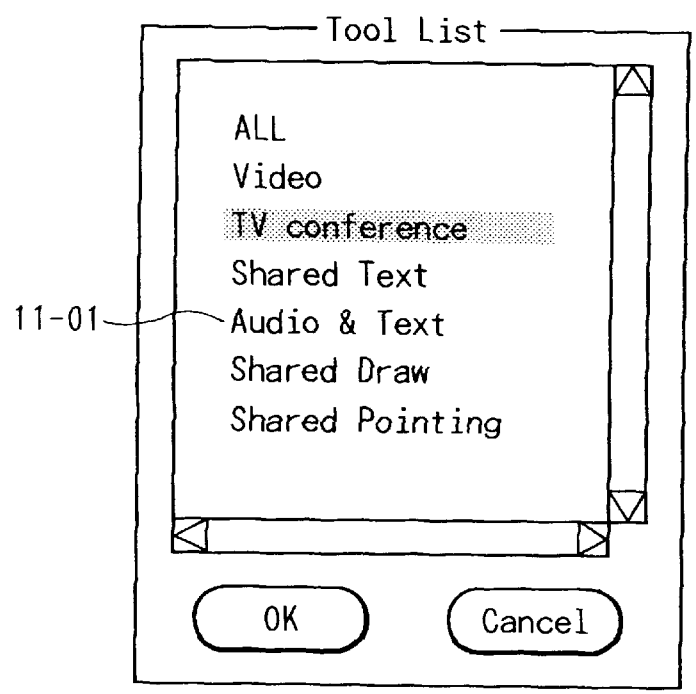
FIG. 11 shows a specific view of a tool selection panel having a set of tools included in list items.

For example, in the television conference system, it is apparent that only the audio tool and the video tool are used. Thus, by merely selecting the television conference tool from the tool panel 901, the same command as that which is issued when the audio tool and the video tool are selected is issued to the connection status operation/control unit. An example of the tool panel is shown in FIG. 11.

In the second embodiment, not only the individual destinations and senders but also set names of destinations and senders are contained in the list items on the connection status modification panels 10-01 and 10-02 (see FIGS. 10A and 10B). As a result, whew the electronic conference is to be held with the same participants every time, it is not necessary to designate the individual participants. For example, when the participants of the regular conference are fixed every time, the regular conference is selected from the connection status modification panels 10-01 and 10-02 so that the same command as that issued when the individual participants are designated is issued to the respective tools used in the electronic conference.

Figure 12:
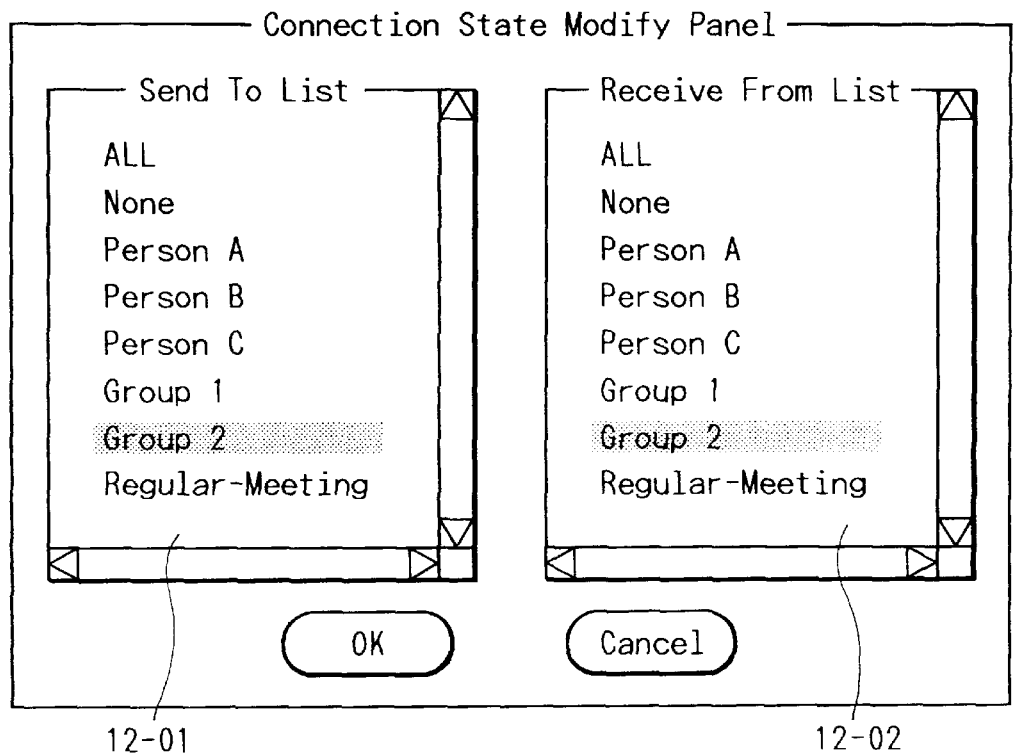
FIG. 12 shows a specific view of a connection status modification panel having a set of destination stations and source stations included in list items.

An example of the connection status modification panel is shown in FIG. 12.

Fifth Embodiment

A fifth embodiment is now explained with reference to the drawings.

FIG. 4 shows a functional block diagram of components of a terminal device of an electronic conference system in accordance with the present embodiment.

Figure 14:
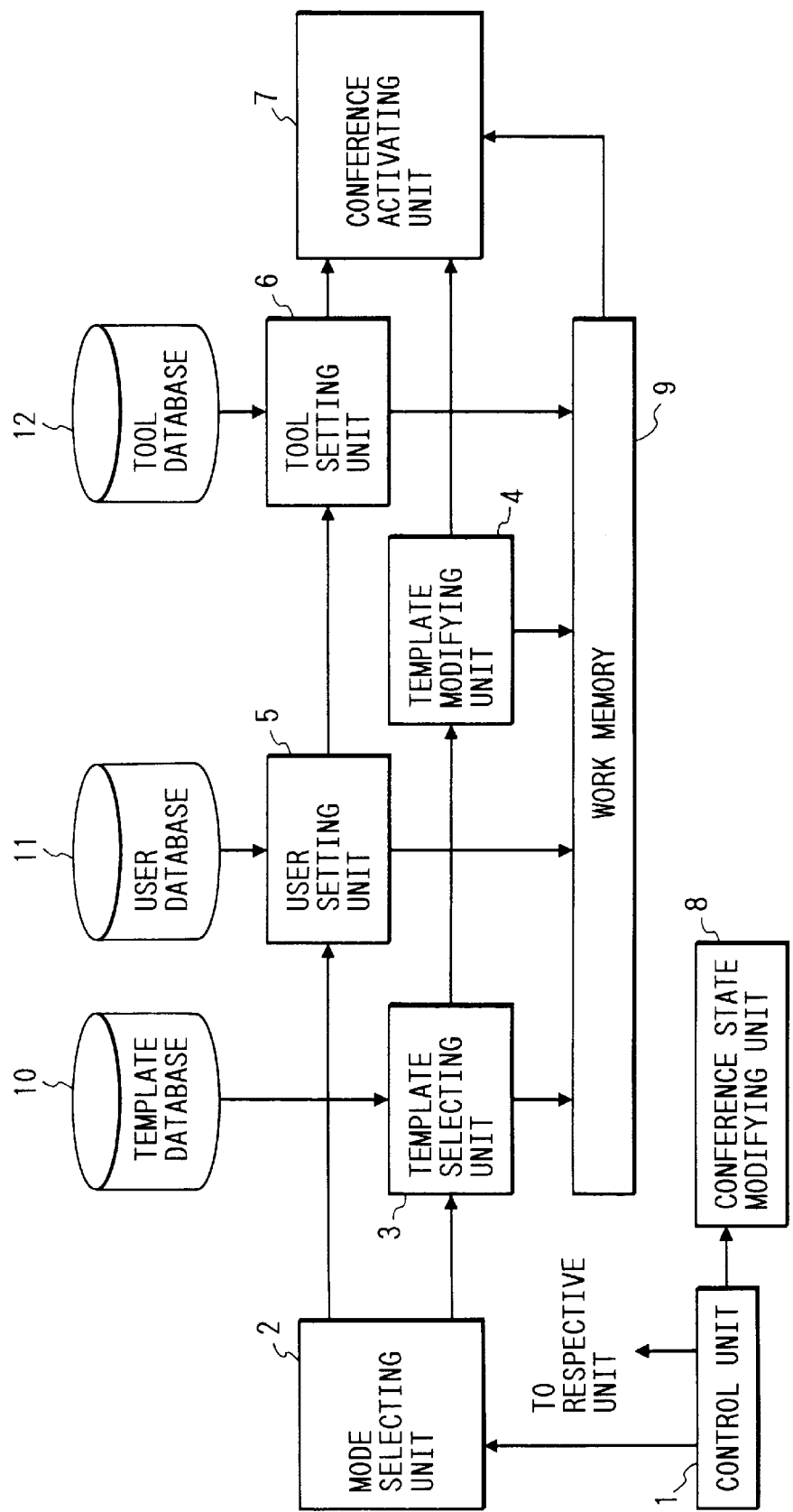
FIG. 14 shows a functional block diagram of components of a terminal device of an electronic conference system in accordance with a fifth embodiment.

In FIG. 14, numeral 1 denotes a control unit which controls respective components shown in FIG. 14 and to be described later. The control unit 1 continuously monitors any input information from the user and conducts an appropriate process in accordance with the input. When the electronic conference is to be started, it is necessary that any means which monitors a signal of "start an electronic conference" from the user is always active. In the present embodiment, the control unit 14 is responsible therefor.

Numeral 2 denotes a mode selection unit which selects the start of a formal conference or an informal conference when the electronic conference is to be started. The mode selection unit 2 functions as means to cause the user who attempts to start the electronic conference to select the formal conference or the informal conference for the conference to be started.

The mode selection unit 2 selectively starts up a template selection unit 3, a user setting unit 5 and a tool selection unit 6 to be described later in accordance with the user designation to help the user in setting the management information necessary to start the conference by the user without confusion.

In starting the formal conference, the template selection unit 3 selects a desired conference template from various conference templates in a template database 10. The template selection unit 3 functions as means for causing the user who attempts to start the formal conference to select a desired template from the template list in the template database 10. Namely, at the start of the formal conference, any template is selected so that the workload to designate all items by the user can be eliminated.

Numeral 4 designates a template modification unit for changing the content of the template selected by the user through the template selection unit 3. Namely, when the item (the participant of the conference, the tool used in the conference, the subject of the conference or the chairman) in the template selected by the user by using the template selection unit 3 is to be modified, the template modification unit 4 is used.

The user setting unit 5 sets the participants of the conference when the informal conference is to be started. The tool setting unit 6 sets the tool to be used in the conference when the informal conference is to be started. The user setting unit 5 and the tool setting unit 6 functions as means for causing the user who attempts to start the informal conference to select the participants of the conference and the tool to be used in the electronic conference.

In order to meet a request to "conduct an electronic conference in a simple manner", it is sufficient to designate the participants of the conference and the tool to be used in the conference and it is not necessary in many cases to designate many settings (such as the subject of conference, the chairman and the access mode). Namely, the user setting unit 5 is introduced to meet the requirement of starting the informal conference as simply as possible.

Numeral 7 denotes a conference start unit which actually operates the electronic conference in accordance with the template selection unit 3, the template modification unit 4 or the management information set by the user setting unit 5 and the tool setting unit 6. Numeral 8 denotes a conference status modification unit which modifies the status of the electronic conference being conducted. For example, by starting the conference status modification unit 8, the conference being conducted may be terminated, the participant may escape from the conference being conducted or the participant may participate in the conference being conducted in the course of conference.

Numeral 9 denotes a work memory which stores information necessary to start the electronic conference (the management information which is set in the manner described above). Numeral 10 denotes a template database including various conference templates, numeral 11 denotes a user database including various information on the participants, and numeral 12 denotes a tool database including various information on the tools to be used in the electronic conference.

Figures 15, 16:
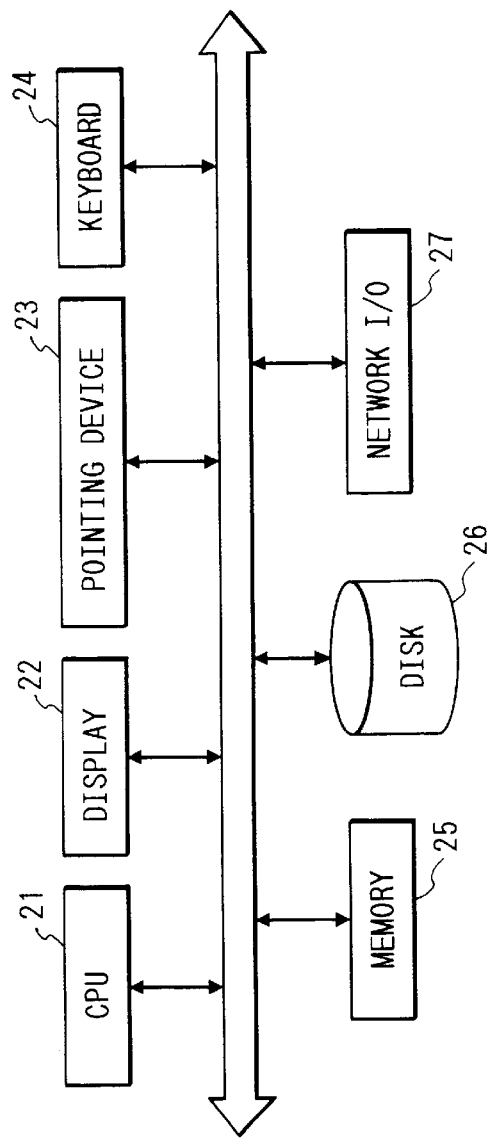
FIG. 15 shows a hardware configuration of the terminal device in the fifth embodiment.
FIG. 16 shows a content of a template selected by a template selection unit in the fifth embodiment.

FIG. 15 shows a hardware configuration of the terminal device in accordance with the present embodiment. The components shown in FIG. 14 are implemented by software on the respective components of FIG. 15.

The present terminal device operates on a CPU 21 and a memory 25 and various information are outputted to a display unit 22 such as CRT or LCD. Thus, the user interface to set the information necessary to start the electronic conference and the content of the conference template are displayed on the display unit 22. The setting of various information to start the conference based on the user interface is conducted by using a pointing device 23 such as a mouse and a keyboard 24.

The data of the template database 10, the user database 11 and the tool database 12 shown in FIG. 14 are stored in a Disk 26. Alternatively, they may be stored in another disk at a remote point on the network constituting the electronic conference system and may be accessed through a network interface (network I/O) 27.

FIG. 16 shows an example of the content of the conference template selected by the template selection unit 3.

In FIG. 16, numeral 31 denotes a template name, numeral 32 denotes an identifier for uniquely identifying the template, numeral 33 denotes a member list indicating the participants of the conference, numeral 34 denotes a tool list indicating the tools used in the electronic conference, numeral 35 denotes a subject of the conference, numeral 36 denotes a chairman of the electronic conference and numeral 37 denotes an access mode of the electronic conference (a mode to determine whether the participation of a third party to the conference in the course of the conference is permitted or not).

Such a template is used to save the workload to start the formal conference such as a regular conference for which the participants and the tools to be used in the conference are fixed every time. As described above, the template database 10 is stored in the disk 26. The template selection unit 3 and the template modification unit 4 refer to the information in the template to simplify the setting of the management information by the user.

Referring to FIGS. 17 to 20, an operation process of the terminal device of the electronic conference system in accordance with the present embodiment shown in FIGS. 14 and 15 is explained.

An operation of the control unit 1 is first explained with reference to a flow chart of FIG. 17.

As described above, the control unit 1 continuously monitors the user input of information by the pointing device 23 or the keyboard 24, and when it detects any information input, it conducts an appropriate process in accordance therewith.

Figure 21:
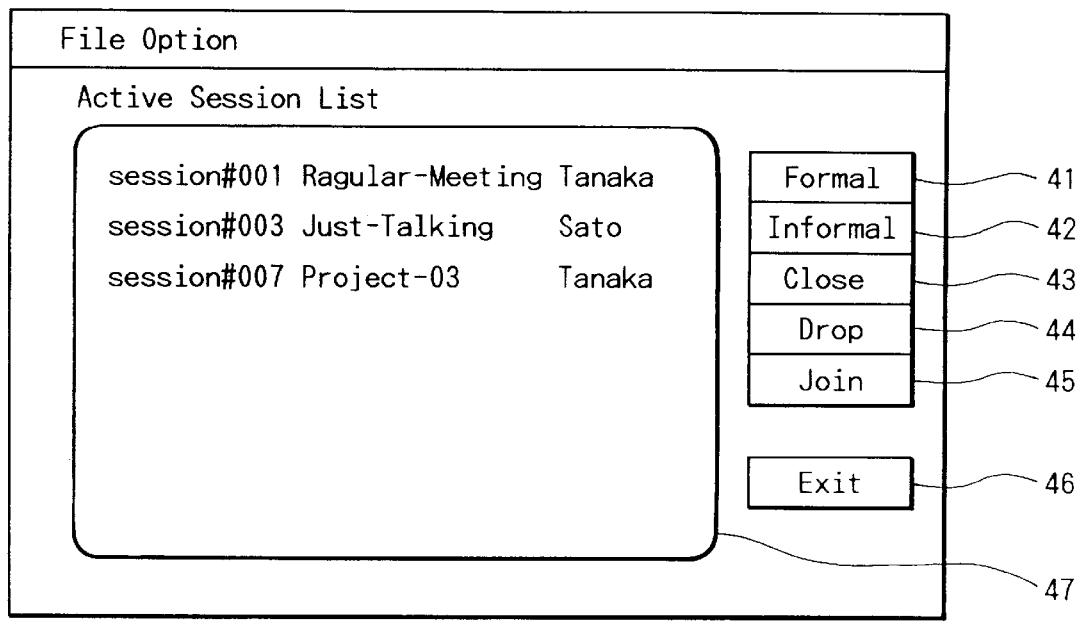
FIG. 21 shows an example of a user interface presented to a user as the control unit is started up in the fifth embodiment.

Namely, when the control unit 1 is started up, an initialization process is conducted in a step S1 and a user interface as shown in FIG. 21 is presented to the user.

In FIG. 21, numerals 41 to 46 denote operation buttons to modify the status of the electronic conference. The user operates those operation buttons 41 to 46 by using the pointing device 23 and the keyboard 24 to issue various commands such as start of conference, end of conference, and participation in the conference in the course of the conference. Namely, a formal button 41 and an informal button 42 command the start of the conference, and the formal button 41 commands the start of the formal conference and the informal button 42 commands the start of the informal conference.

A close button 43, a drop button 44 and a join button 45 command the modification of the status of the electronic conference being conducted. The close button 43 commands the termination of the electronic conference, the drop button 44 commands the escape from the electronic conference and the join button 45 commands the participation in the electronic conference in the course of the conference.

An exit button 46 commands to stop the present system. Numeral 47 denotes a conference table display area which displays a table of the electronic conference being conducted.

Figure 17:
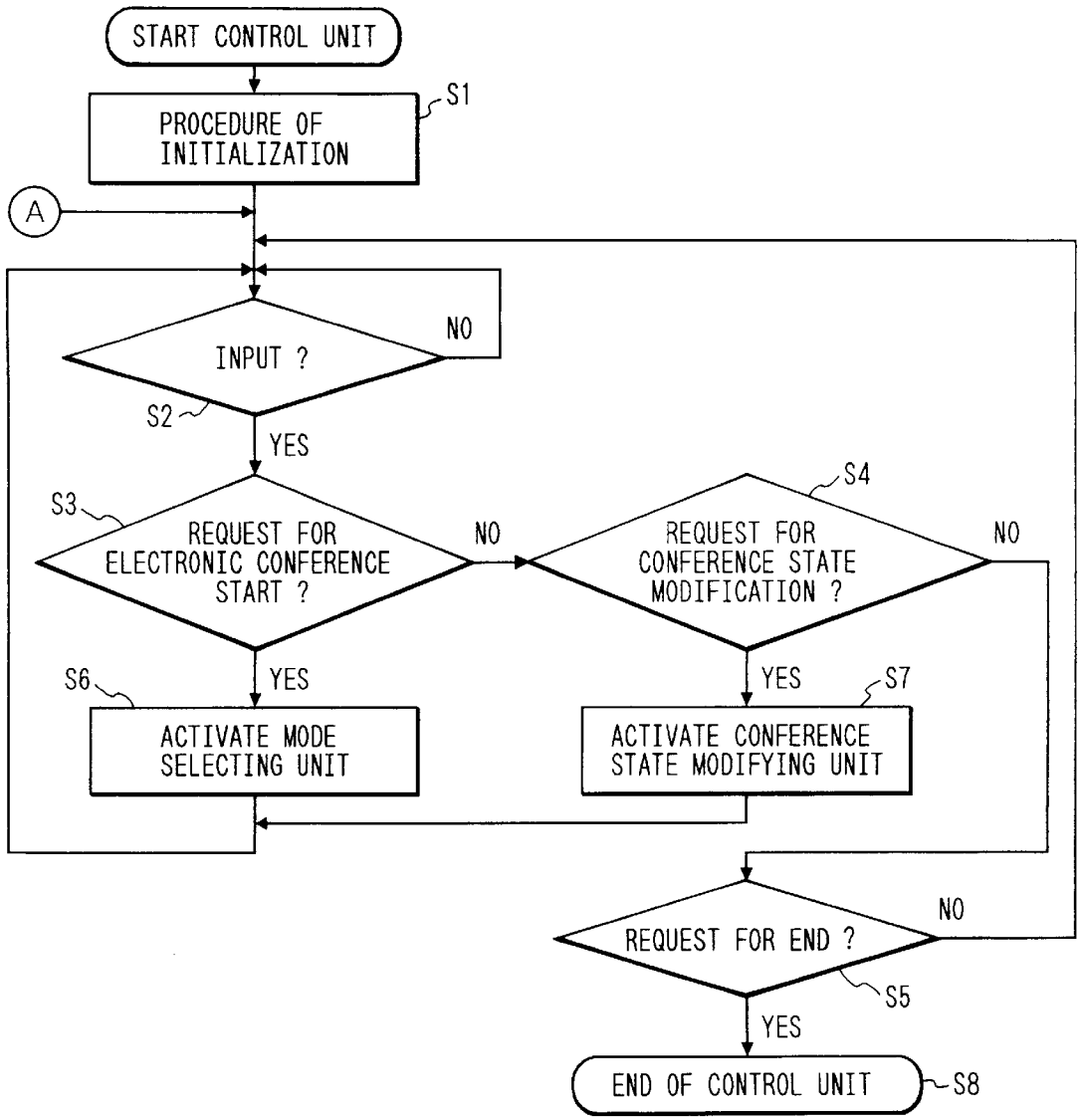
FIG. 17 shows a flow chart of an operation of a control unit in the fifth embodiment.

The control unit 1 determines whether information input from the user is detected or not in a step S2 of FIG. 17. When the user input (the depression of any one of the operation buttons 41 to 46) is detected, whether the request by the user input is the request to start the electronic conference or not (whether the formal button 41 or the informal button 42 was depressed) is determined in a step S3. If the user request is the request to start the electronic conference, the process proceeds to a step S6 to start up the mode selection unit 2.

On the other hand, if the user request is not the request to start the electronic conference, whether the request is the request to modify the status of the electronic conference or not (whether the close button 43, the drop-button 44 or the join button 45 was depressed or not) is determined in a step S4. If the user request is the request to modify the status of the electronic conference, the process proceeds to a step S7 to start the conference status modification unit 8.

When the close button 43 was depressed, the conference status modification unit 8 terminates the electronic conference designated by the user from the electronic conferences displayed in the conference table display area 47. When the drop button 44 was depressed, the conference status modification unit 8 allows the exit from the electronic conference designated by the user. When the join button 45 was depressed, the conference status modification unit 8 allows the participation electronic conference designated by the user in the course of the conference.

When the user request is neither the request to start the electronic conference nor the request to modify the status of the electronic conference, whether the request is the request to terminate the system or not (whether the exit button 45 was depressed or not) is determined in a step S5. If the user request is the request to terminate the system, the control unit 1 terminates the system in a step S8. When the user request does not fall within any of the above requests, the control unit 1 invalidates the user input and returns to the step S2 to monitor the information input.

Figure 18:
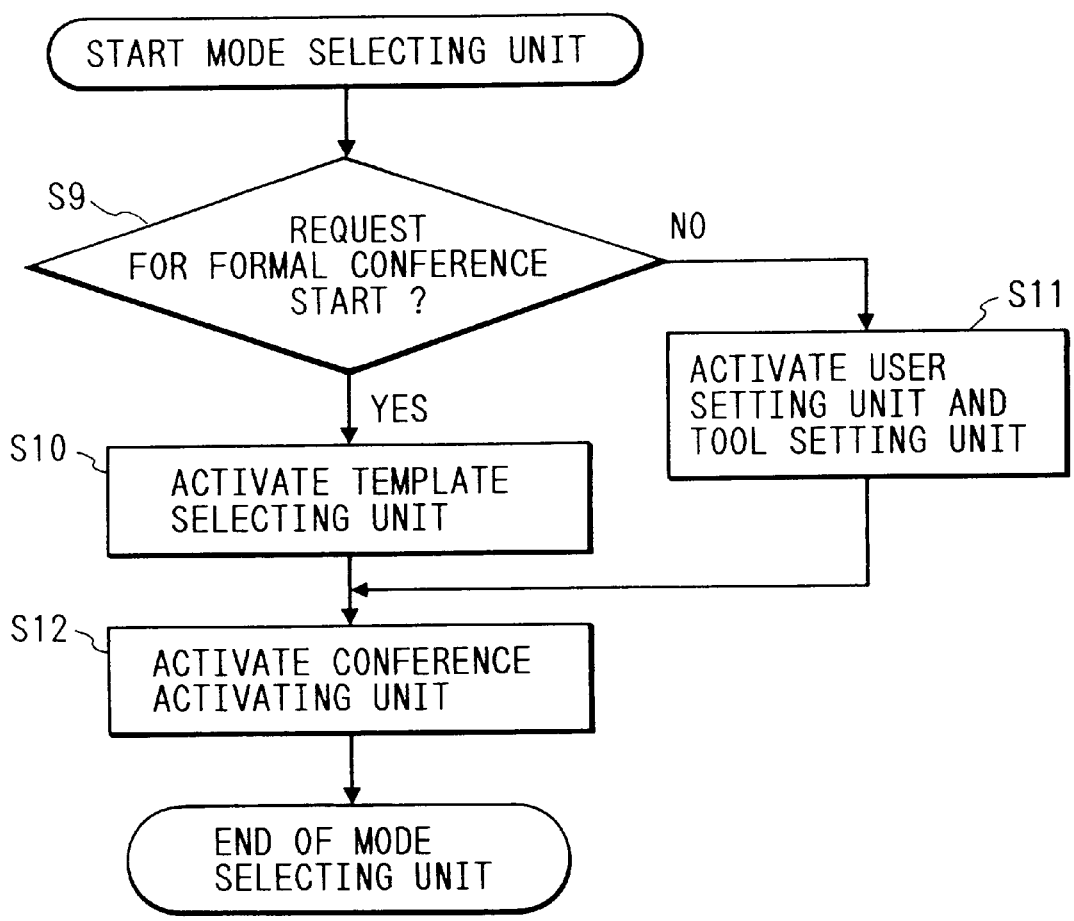
FIG. 18 shows a flow chart of an operation of a mode selection unit in the fifth embodiment.

FIG. 18 shows a flow chart of an operation of the mode selection unit 2 which is started up in the step S6. Referring to the flow chart of FIG. 18, the operation of the mode selection unit 2 is explained.

In FIG. 18, the mode selection unit 2 determines whether the user request to start the electronic conference is the request to start the formal conference or the request to start the informal conference in a step S9.

If the user request is the request to start the formal conference (when the formal button 41 was depressed), the process proceeds to a step S10 to start up the template selection unit 3. When the user request is the request to start the informal conference (when the informal button 42 was depressed), the user setting unit 5 and the tool setting unit 6 are started up in a step S11.

A content of the process in the step S10 for the request to start the formal conference and the step S11 for the request to start the informal conference is to store the name of the information required to operate the conference start-up unit 7 in a step S12 (session name, user list, tool list, subject, chairman and access mode) in the work memory 9 of FIG. 1.

When the process of the step S10 or S11 is completed, the conference start-up unit 7 is started up in the step S12. The conference start-up unit 7 reads the information necessary to start the electronic conference from the work memory 9 and presents the read information (subject, chairman, list of tools to be used in the conference and list of participants) to all participants of the conference and requests to start the electronic conference to all participants of the conference. Through this procedure, the formal or informal electronic conference is started.

In the above example, a desired template is selected when the formal conference is to be started. Alternatively, a template may be selected when the informal conference is to be started. In this case, since the management information necessary to start the informal conference is less than the management information necessary to start the formal conference (only the participants of the conference and the tools to be used in the conference are necessary), the template to be used to start the informal conference may be a simple one.

Figure 19:
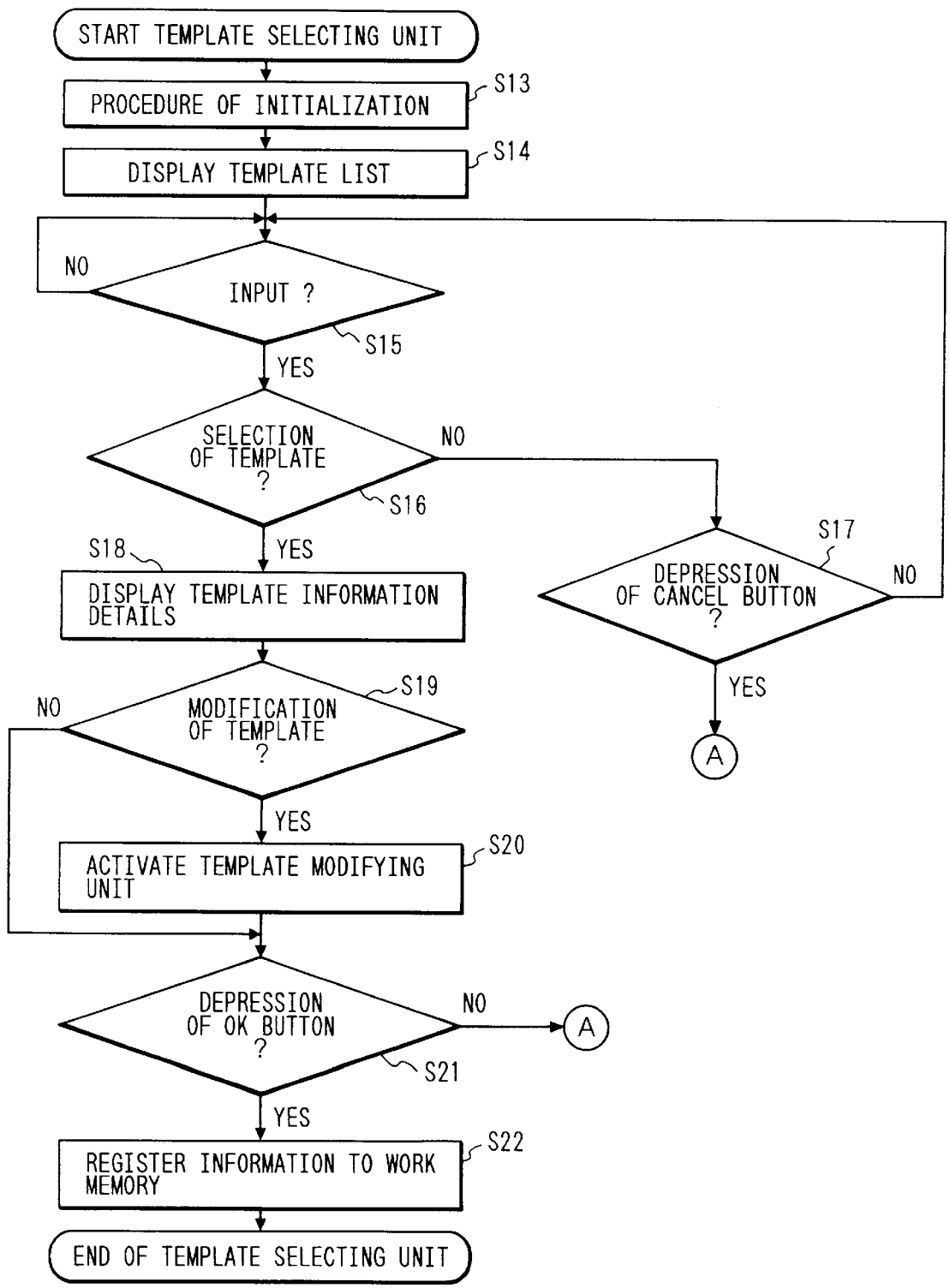
FIG. 19 shows a flow chart of an operation of a template selection unit in the fifth embodiment.

FIG. 19 shows a flow chart of an operation of the template selection unit 3 which is started in the step S10. The operation of the template selection unit 3 is now explained with reference to the flow chart of FIG. 19.

As described above, the template selection unit 3 provides means for the user to select a desired template from the template list stored in the template database.

Figure 22:
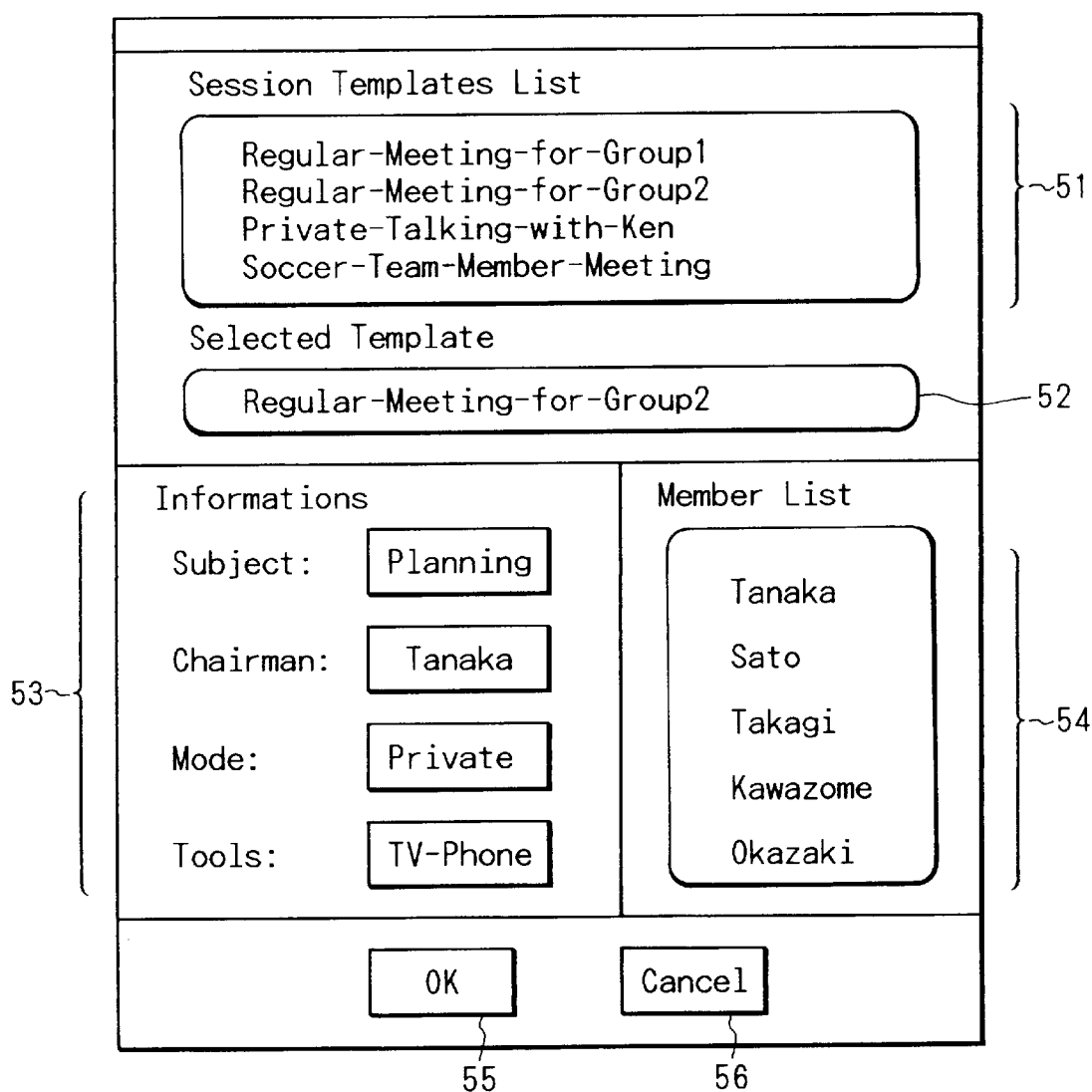
FIG. 22 shows an example of a user interface presented to the user as the template selection unit is started up in the fifth embodiment.

In FIG. 19, the template selection unit 3 presents a user interface as shown in FIG. 22 to the user in an initialization step of a step S13.

Numeral 51 in FIG. 22 denotes a template list display area to display the template list. The user clicks the mouse on the template list displayed in the template list display area 51 to select a desired template.

Numeral 52 denotes an area to display the name of the template selected by the user, numeral 53 denotes an area to display the information of the template (subject, chairman, access mode and tools to be used in the conference), numeral 54 denotes an area to display the participants of the conference, numeral 55 denotes an OK button which the user depresses to start the electronic conference by the setting on the interface and numeral 56 denotes a cancel button which the user depresses to cancel the start command for the electronic conference.

The selection unit 3 reads the template data from the template database 10 in a step S14 and displays a list of the template data in the template list display area 51. In a step S15, it monitors a user input.

When the user input is detected in the step S15, the process proceeds to a step S16 to determine whether the user input is the selection of a desired template on the template list display area 51.

If the user input is the selection of the template, the process proceeds to a step S18 to display the name of the template selected by the user in the selected template name display area 52 and displays the information such as the subject, the chairman, the access mode, the tools and the participants in the template information display area 53 and the participant display area 54. On the other hand, if the user input is not the selection of the template, the process proceeds to a step S17 to determine whether the input is the depression of the cancel button 56 or not. If the user input is the depression of the cancel button 56, the process returns to the step S2 of FIG. 17 to monitor the input to the control unit 1.

After the template information is displayed in detail in the step S18, whether the user input has been made to each item of the template information display area 53 and the participant display area 54 is determined in a step S19. If the user input has been made to any item of the template information display area 53 and the participant display area 54 (for example, when the subject or the chairman is to be modified), the template modification unit 4 is started up in step S20.

The template modification unit 4 comprises a text information input unit and a template data update unit, not shown. The template data update unit updates the content of the template data read from the template data base 10 to the content inputted to the respective items in the template information display area 53 and the participant display area 54 by the text information input unit. In this manner, in the present embodiment, the members of the conference and the tools used in the conference which are the content of the conference template selected by the template selection unit 3 are added or deleted to modify the information necessary to start the conference as required.

When the modification and the confirmation have been completed for all items which the user wants to modify and the depression of the OK button is detected in a step S21, the information necessary to start the electronic conference (the information of the items set on the user interface of FIG. 9) is written into the work memory 9 in a step S22 and the process of the template selection unit 3 is terminated.

When the formal conference is to be held, it is not necessary in many cases to modify the information in the template information display area 53 and the participant display area 54. In such a case, the template data is not modified in the step S20 and the OK button 55 is depressed. In this case, the formal conference may be started by merely selecting a desired template and a necessary operation to start the conference may be simplified.

An operation of the user setting unit 5 and the tool setting unit 6 started up in the step S11 of FIG. 18 is now explained with reference to a flow chart of FIG. 20.

Figure 20:
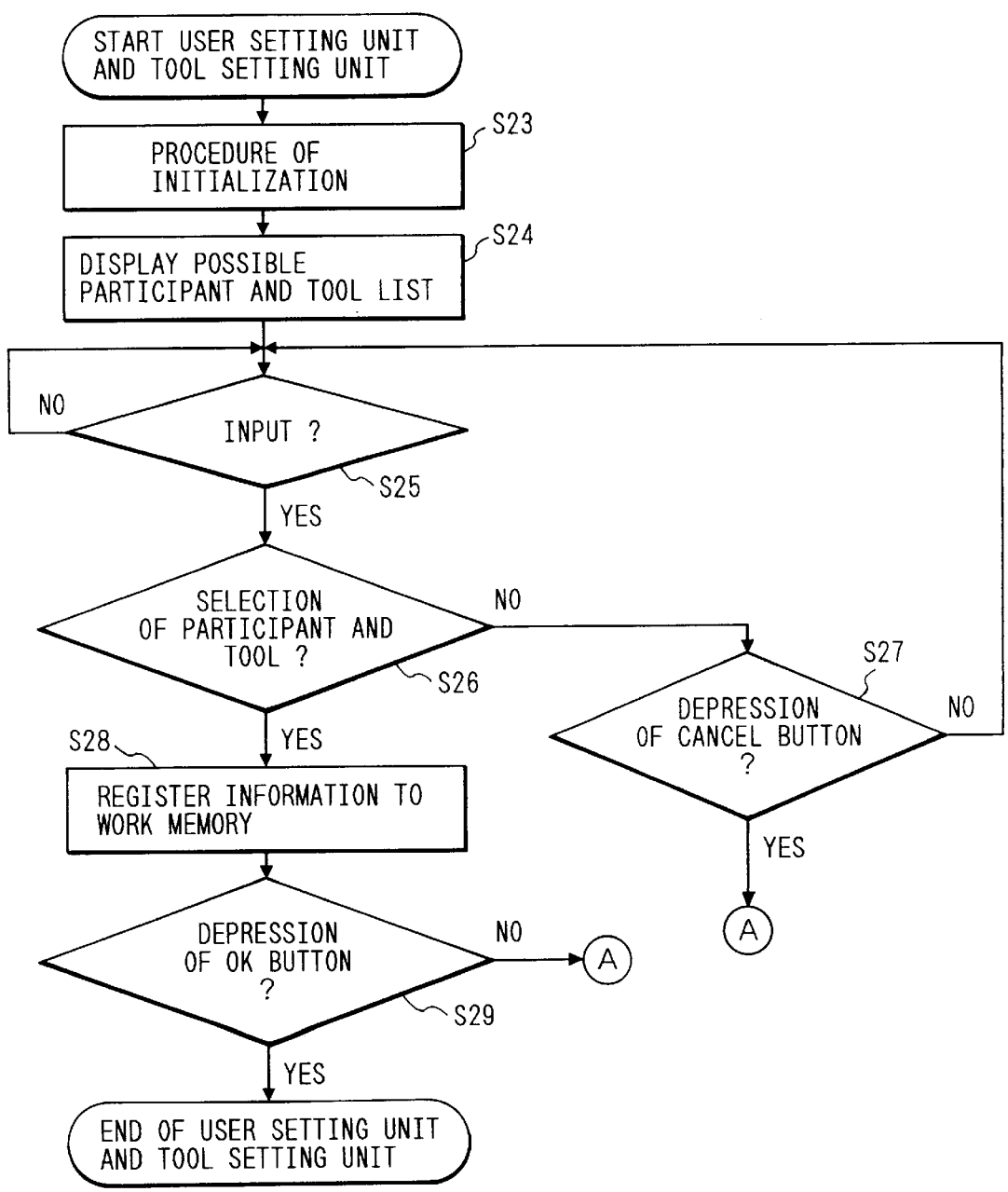
FIG. 20 shows a flow chart of an operation of a user setting unit and a tool setting unit in the fifth embodiment.
Figure 23:
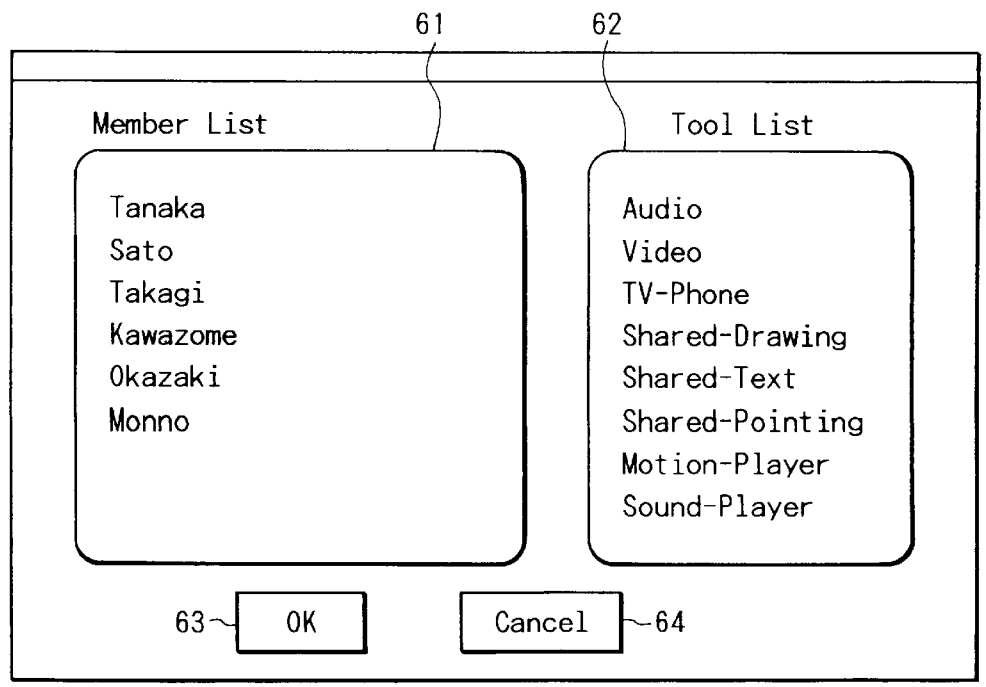
FIG. 23 shows an example of a user interface presented to the user as the user setting unit and the tool setting unit are started up in the fifth embodiment.

In FIG. 20, the user setting unit 5 and the tool setting unit 6 present a user interface as shown in FIG. 23 to the user in an initialization step of a step S23.

In FIG. 23, numeral 61 denotes an area to display a list of persons who may participate in the conference and numeral 62 denotes an area to display a list of tools which may be used in the electronic conference. The user clicks the mouse on the participant list and the tool list displayed on the display areas 61 and 62 to select desired participants and tools. Numeral 63 denotes an OK button which the user depresses to start the electronic conference by the setting on the user interface and numeral 64 denotes a cancel button which the user depresses to cancel the command to start the electronic conference.

In a step S24, the user setting unit 5 reads the names of persons who may participate in the electronic conference from the user database 11 and displays them in the participant list display area 61 of the user interface shown in FIG. 23. The tool setting unit 6 reads the tools which may be used in the electronic conference from the tool database 12 and displays them in the tool list display area 62 of the user interface shown in FIG. 23.

In a step S35, the user input is monitored, and if the user input is detected in the step S25, the process proceeds to a step S26 to determine whether the user input is the selection of the desired participant and tool on the participant list display area 61 and the tool list display area 62 or not.

If the user input is the selection of the participant of the conference and the tool to be used in the conference, the process proceeds to a step S28 to write the information of the selected participant and tool into the work memory 9. On the other hand, if the user input is not the selection of the participant and the tool to be used, the process proceeds to a step S27 to determine whether the input is the depression of the cancel button 64 or not. If the user input is the depression of the cancel button 64, the process returns to the step S2 of FIG. 17 to monitor the input to the control unit 1.

In the step S28, after the minimum information necessary to start the electronic conference has been written into the work memory 9, the depression of the OK button 63 is detected in a step S29 and the process of the user setting unit 5 and the tool setting unit 6 is terminated. The process proceeds to the step S12 of FIG. 5 to start up the conference start unit 7.

Thus, when the informal conference is to be started, the electronic conference may be started by merely designating the participant of the conference and the tool to be used in the conference, and other information such as the subject, the chairman and the access mode need not be set. Accordingly, the workload to start the conference is reduced.

In accordance with the present embodiment, one who attempts to start the conference may select the start of the formal conference or the start of the informal conference in accordance with the nature of the conference to be started.

If the start of the formal conference is selected, the mere designation of the template of the conference is required to start the conference. When the start of the informal conference is selected, the mere designation of the participant of the conference and the tool to be used in the conference is required to start the conference. Since the setting of the information on the tool to be used in the electronic conference is allowed, the template having appropriate tools set therein may be selected in accordance with the type of electronic conference (report meeting, regular conference, brainstorming or presentation). Further, by including the information on the chairman in the template, the information on the user who will play a special role among the participants of the conference may be used in the individual tools.

In accordance with the fifth embodiment, since the electronic conference may be started by using the conference template having the management information necessary to start the electronic conference set therein, the management information may be set in a simple manner and the workload of the user to start the conference may be reduced. Further, since various conference templates are provided, an appropriate template may be used in accordance with the electronic conference to be started so that the system is compatible to various types of electronic conferences.

Since the participant setting means, the tool setting means and the mode setting means are provided, one who attempts to start the electronic conference may select the start of the formal conference or the start of the informal conference in accordance with the nature of the conference to be started. When the start of the formal conference is started, the mere selection of the desired conference template is required to start the electronic conference, and when the start of the informal conference is selected, the mere selection of the participant of the conference and the tool to be used in the conference is required to start the electronic conference. Accordingly, the workload of the user to start the conference may be reduced.

Further, since the template modification means to modify the content of the conference template is provided, the content of the conference template may be modified prior to the start of the electronic conference. Thus, whatever type of formal conference may be started, a conference template compatible to that formal conference may be prepared and used.

Sixth Embodiment

A sixth embodiment of the electronic conference system is now explained with reference to the drawings.

FIG. 24 shows a block diagram of components of the electronic conference system of the present embodiment. The components are explained below.

In FIG. 24, numeral 1101 denotes conference participation request notice means which outputs a notice requesting the participation in the conference to an invites and displays it.

Numeral 1102 denotes a message input means to input a message to the invitee before the invitee selects the participation/non-participation in the conference.

Numeral 1103 denotes conference participation selection means to select by the invitee the participation or the non-participation in the conference and numeral 1104 denotes conference participation information generation means for generating the conference participation/non-participation information of the invitee and the message information of the inviter.

Numeral 1105 denotes control means for controlling the components of the conference participation request display means 1101 to the conference participation information generation means 1104.

Numeral 1106 denotes conference start means to start the electronic conference by the electronic conference system of the present embodiment, which includes conference participation information notice means 1106*a*.

Numeral 1107 denotes a data bus to interconnect the components.

In the electronic conference system of the present embodiment thus configured, when one user (inviter) attempts to start the electronic conference, he starts up the conference start means set members (invitees) whom he wants to participate in the conference and the terminals which the members use, and requests the participation in the conference through the data bus 1107. The conference start means calls for the conference to each of the invitees.

The conference participation request display means 1101 to the conference participation information generation means 1104 execute various processes in the terminal devices of the invitees when the conference is called by the conference start means of the inviter, and the control means 1105 controls those means.

Figure 29:
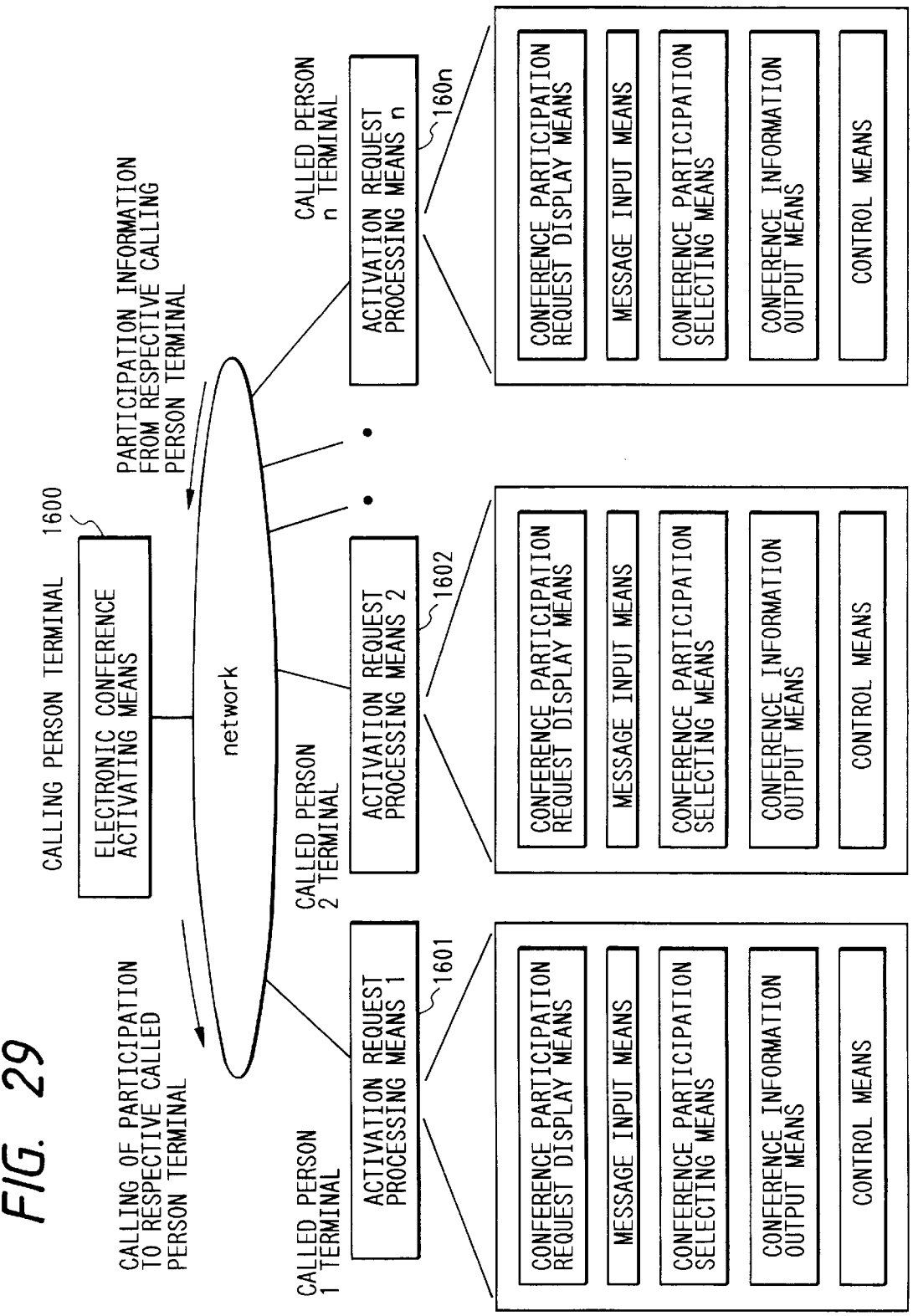
FIG. 29 illustrates a start-up status at the start-up of the components of the electronic conference system in the sixth embodiment.

Namely, when the conference start means is started up at the terminal device of the inviter to call the conference, the components of the conference participation request display means 1101 to the control means 1105 are started up at each terminal device of the invitee as shown in FIG. 29.

In FIG. 29, electronic conference start means 600 which is started up in the inviter terminal device corresponds to the conference start means of FIG. 24 and the start request process means 601, . . . 60*n* which are started in the invitee (1 to n) terminals comprise the respective components of the conference participation request display means 101 to the control means 105 of FIG. 24.

When the inviter calls the conference by the conference start means, the respective invitee terminal devices operate in the following manner. First, the conference participation request display means 1101 displays that the request for participation to the conference has been issued from the inviter to the invitees (one of them being a user A).

At the same time, an elapsed time from the occurrence of the conference participation request is visually displayed. When it is displayed, the user A selects the participation or the non-participation in the conference by the conference participation selection means 1103. If he wants to convey some message to the conference inviter, he may input any message by the message input means 1102 before he selects the participation or the non-participation.

The input information on the participation/non-participation of the user A in the conference and the input message are generated by the conference participation information generation means 1104 as the conference participation information of the user A. The conference participation information of the user A generated by the conference participation information generation means 1104 is supplied to the conference start means through the data bus 1107.

The conference start means displays the conference participation information generated by the conference participation information generation means 1104 on a display device 1717 (see FIG. 30) of the inviter terminal device as an invitee conference participation information display window. Namely, the conference start means of the present embodiment has a function of conference participation information notice means for notifying the conference participation information of the invitees to the invitees.

Figure 30:
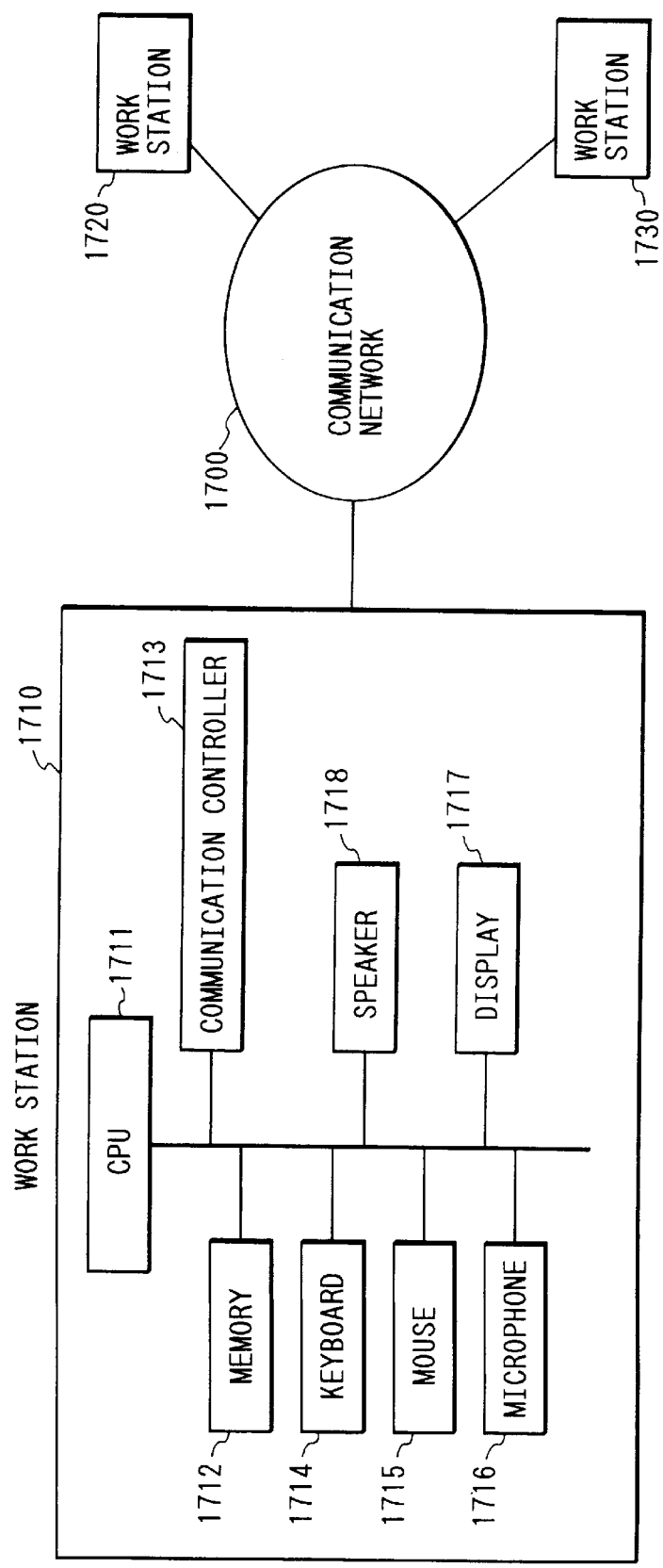
FIG. 30 shows a hardware configuration of the electronic conference system to implement the sixth embodiment.

FIG. 30 shows a hardware configuration to implement the electronic conference system of the present embodiment.

As shown in FIG. 30, in the electronic conference system of the present embodiment, work stations 1710, 1720 and 1730 which function as the terminal devices are interconnected by a communication network 1700 to conduct the electronic conference while conducting the intercommunication.

Each of the work stations 1710, 1720 and 1730 comprises a CPU 1711, a memory 1712, a communication control unit 1713, a keyboard 1714 for accepting an interactive input, a mouse 1715, a microphone 1716, and a display device 1717 and a speaker 1718 which function as output devices.

Figure 25:
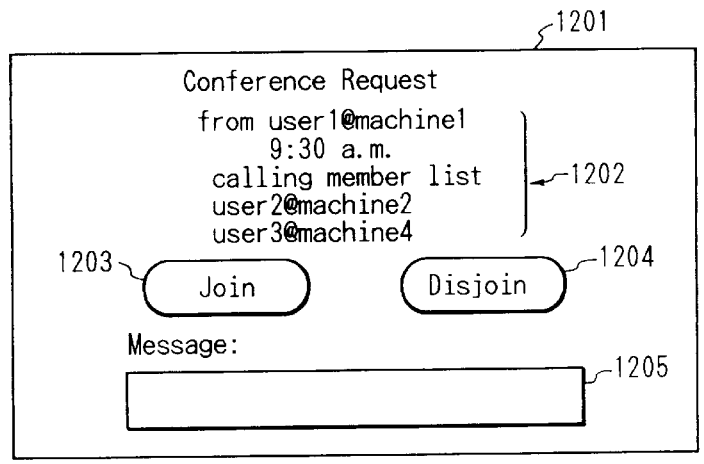
FIG. 25 shows an example of a window for noticing a conference participation request displayed by conference participation request means in the fifth embodiment.

FIG. 25 shows an example of content of the participation request displayed by the conference participation request display means 1101. A window 1201 is displayed on the display device 1717 of the invitee terminal device to request the participation.

The conference participation request display means 1101 records an elapsed time from the display of the conference participation request to the current time and a color of a frame of the window 1201 is modified in accordance with the elapsed time to notify to the invitee the elapsed time from the request for the participation to the conference. Namely, the conference participation request display means 1101 of the present embodiment has elapsed time notice means 1101b.

For example, the color of the frame may be modified by proving the following table where t is the elapsed time.

| Elapsed Time t (seconds) | Color of window frame |
|---|---|
| $0 \leq t \leq n1$ | black |
| $n1 \leq t \leq n2$ | green |
| $n2 \leq t \leq n3$ | blue |
| $n3 \leq t \leq n4$ | violet |
| $n4 \leq t \leq n5$ | pink |
| $n6 \leq t$ | red |

In FIG. 25, numeral 1202 denotes information on the conference call (the name of the inviter, the terminal name of the inviter, the call time and the invitee list). Numerals 1203 and 1204 denote buttons to select the participation or the non-participation the conference. The decision of the invitee to participate or not participate in the conference is attained by depressing the button 1203 or 1204 by clicking it by a mouse 1715.

Numeral 1205 denotes a message input column. The entry of a message to be transmitted from the invitee to the inviter is attained by moving the mouse 1715 to the input column 1205 and entering characters from the keyboard 1714.

Figure 26:
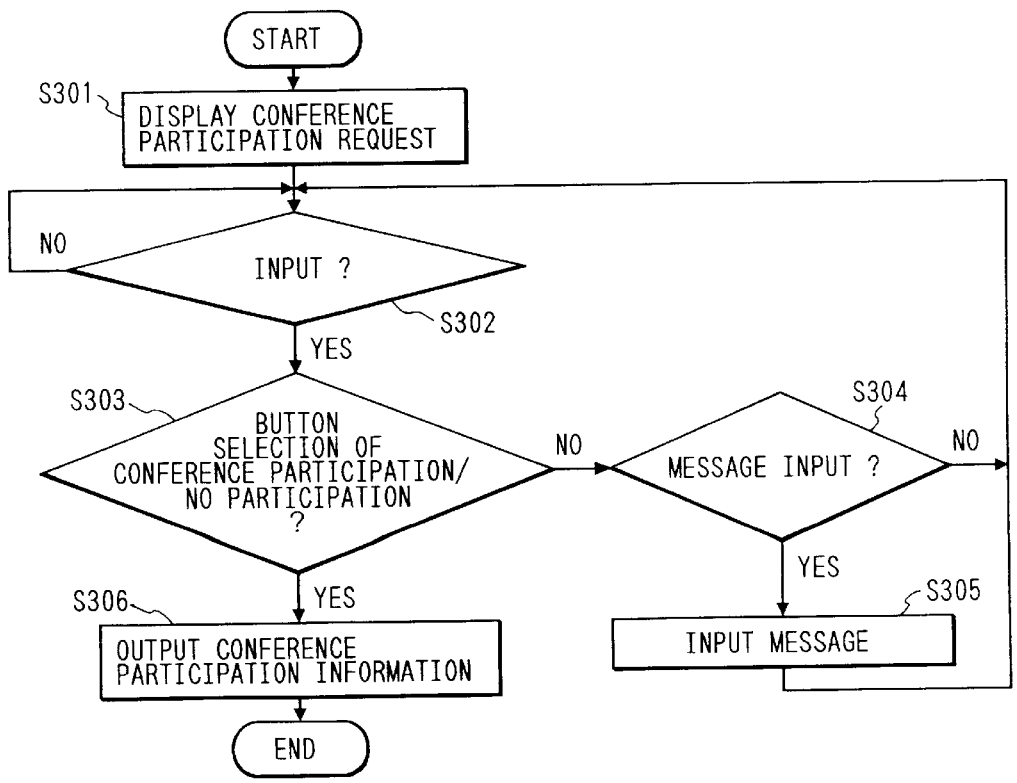
FIG. 26 shows a flow chart of an operation performed by each invitee terminal in a sixth embodiment.

FIG. 26 shows a flow chart of an operation in the invitee terminal which is conducted by the components of the conference participation request display means 1101 to the control means 1105 of FIG. 24.

Namely, when the operation is started, the window 1201 shown in FIG. 25 is displayed on the invitee terminal device and the entry is made by the mouse 1715 on the window and the keyboard 1714.

First, the conference participation request panel 1201 is displayed by the conference participation request display means 1101 (step S301).

Then, in a step S302, the user input is monitored. When the user input which is conducted through the operation of the mouse 1715 or the keyboard 1714 is detected, the process proceeds to a step S303.

In the step S303, whether the conference participation button 1203 or the non-participation button 1204 has been depressed or not is detected. When the depression of one of those buttons is detected, the process proceeds to a step S306 to output the conference participation information through the conference participation information generation means 1104, and the process is terminated.

In the step S303, if the input in the step S302 is not the depression of the conference participation/non-participation button, the process proceeds to a step S304 to determine whether the input is the character input to the message input column 1205 by the keyboard operation or not. If it is the message input, the process proceeds to a step S305 to enter the message, and when the message has been entered, the process returns to the step S302 to monitor the input.

On the other hand, if the input is neither the button operation nor the keyboard input, the process returns to the step S302 to monitor the input.

Figures 27, 28:
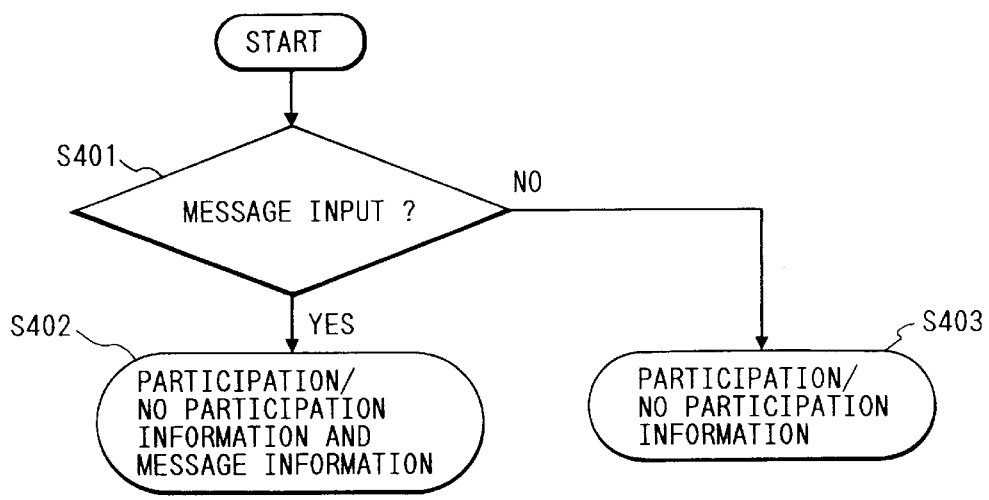
FIG. 27 shows a flow chart of an operation of conference participation information generation means in the sixth embodiment.
FIG. 28 shows an example of an invitee conference participation information display window displayed by an inviter by conference start means in the sixth embodiment.

FIG. 27 shows a flow chart of an operation of the conference participation information generation means 1104. The conference participation information generation means 1104 is started up when the participation button 1203 or the non-participation button 1204 in the participation request window 1201 shown in FIG. 25 is depressed.

When it is started up, whether a message input has been made or not is determined in a step S401. If the message input has been made, namely, if characters have been entered in the message input column 1205, the process proceeds to a step S402.

In the step S402, the character information in the message input column 1205 and the participation/non-participation information are generated as the conference participation information. In the decision of the step S401, if the message input has not been made, the process proceeds to a step S403 to generate only the participation/non-participation information.

The participation/non-participation information in the conference participation information of the invitee member A is as follows:

User: A

Participate/Reject: Non-Participation

Message: Call again 5 minutes later!

This indicates that the member A does not participate in the conference and entered the message "Call again 5 minutes later!" at the time of the call.

On the other hand, when there is no message input, Message: (Null) is displayed.

FIG. 28 shows an example of the invitee conference participation information display window displayed by the conference start means. The display is updated each time the output of the conference participation information generation means 1104 started up at the terminal device of each of the invited members is received.

In the present example, the users A and B returned the conference participation information and the content thereof is that the user A does not participate in the conference and the message is "Call again 5 minutes later".

The user B participates in the conference with no message input. No conference participation information has been received from the user C and "No response" is displayed.

In the present embodiment, the message input column is provided in the conference participation request window of FIG. 25 in which the message information is displayed by the conference participation request notice means, as the message input means 1102 from the invitee, and the invitee enters the text by using the character input device such as the keyboard. Alternatively, an audio input device such as a microphone may be used to enter the content to be conveyed from the invitee to the inviter as audio information.

In this case, the conference participation information generation means of the invitee transmits the conference participation/non-participation information of the invitee and the message information converted to the audio signal by using an audio encoder to the conference start unit. When the conference start unit receives the conference participation information, it reproduces the audio information which is the message information by using an audio decoder.

Further, the elapsed time from the occurrence of the request for the participation in the conference to the invitee is provided to the invitee by changing the color of the window frame in accordance with the elapsed time.

However, the elapsed time from the occurrence of the request to participate in the conference may be provided to the invitee by flashing the window frame at a predetermined interval in accordance with the elapsed time. Namely, the window frame may be flashed at the predetermined interval by providing the following table, where t is the elapsed time.

| Elapsed Time t (seconds) | Flash Interval of Window Frame (seconds) |
|---|---|
| $0 \leq t \leq n1$ | 10 |
| $n1 \leq t \leq n2$ | 5 |
| $n2 \leq t \leq n3$ | 2.5 |
| $n3 \leq t \leq n4$ | 1 |
| $n4 \leq t \leq n5$ | 0.5 |
| $n6 \leq t$ | 0.25 |

Namely, any method to inform the elapsed time from the occurrence of the request to participate in the conference to the invitee may be used and it is not limited to the display of the window but audio information may be used.

In accordance with the sixth embodiment, since the elapsed time inform means is provided, the invitee can readily grasp the elapsed time from the occurrence of the request to participate in the conference. Thus, if the invitee found that the elapsed time is very long, he may send a message apologizing to the invitor for the delay of the response to the request to participate in the electronic conference. Thus, the electronic conference system may be flexibly operated.

Further, since the message input means to allow the invitee to enter the message to be sent to the invitor is provided, the message to the invitor may be entered before the invitee selects the participation or non-participation in the called electronic conference, and the amount of information which can be conveyed to the invitor can be significantly increased.

Further, the invitee can readily grasp the elapsed time from the occurrence of the request to participate in the electronic conference to the current time, and at the same time the invitee can enter the message to the invitor and advise the invitor before the invitee selects the participation or non-participation in the called electronic conference.

Further, since the information on whether the invitee will participate in the electronic conference or not and the message information sent to the invitor by the invitee when he is invited are transmitted as the conference participation information of the invitee through the conference participation information inform means, the participation/non-participation information as well as various messages from the invitee to the invitor can be transmitted.

Further, the message input from the invitee to the invitor is attained by the text input from the character input device including the keyboard.

The message input from the invitee to the invitor may be entered by the audio input from the audio input device including the microphone.

Further, since the color of the window frame which indicates the request to participate in the electronic conference is modified in accordance with the elapsed time from the occurrence of the request to participate in the electronic conference, the invitee can visually grasp the elapsed time so that he may readily grasp the elapsed time.

Further, since the window frame which indicates the request to participate in the electronic conference is flashed at an interval determined by the elapsed time from the occurrence of the request to participate in the electronic conference, the invitee can visually grasp the elapsed time so that he may readily grasp the elapsed time.

What is claimed is:

1. A communication conference apparatus comprising:
    setting means for setting a direction of communication between said apparatus and each of the other communication conference apparatuses participating in a communication conference, said setting means setting said direction at any time during the communication conference; and
    connecting means for connecting communication lines in accordance with the direction of communication set by said setting means.

2. A communication conference apparatus according to claim 1, wherein the direction of communication is one of unidirectional transmission only, unidirectional reception only and bidirectional communication.

3. A communication conference apparatus according to claim 1, further comprising display means for displaying said other communication conference apparatuses participating in the communication conference.

4. A communication conference apparatus according to claim 3, wherein the setting by said setting means is displayed on said display means.

5. Apparatus according to claim 1, wherein said apparatus communicates at least voice and image information.

6. Apparatus according to claim 1, further comprising a plurality of communication conference apparatuses, and wherein each communication conference apparatus has a setting means which can set the direction of communication between its apparatus and each of the other communication conference apparatuses participating in the communication conference.

7. Apparatus according to claim 1, wherein said setting means includes a display unit, and wherein said display unit displays plural data corresponding to the participants of the communication conference.

8. A communication conference system comprising:
    a plurality of communication conference apparatuses;
    setting means for setting a direction of communication between the plurality of communication conference apparatuses participating in a communication conference, said setting means setting said direction at any time during the communication conference; and
    connection means for connecting communication lines in accordance with the direction of communication set by said setting means.

9. A communication conference method for use amongst a plurality of communication conference apparatuses, said method comprising the steps of:
    setting a direction of communication between one apparatus and each of the other communication conference apparatuses participating in a communication conference, the setting step setting the direction at any time during the communication conference; and
    connecting communication lines among the plurality of communication conference apparatuses in accordance with the direction of communication set in said setting step.

10. A method according to claim 9, wherein the direction of communication is one of uni-directional transmission only, uni-directional reception only, and bi-directional communication.

11. A method according to claim 9, further comprising the step of displaying the other communication conference apparatuses participating in the communication conference.

12. A method according to claim 11, wherein the setting step is displayed in the display step.

13. A method according to claim 9, wherein the communication conference communicates at least voice and image information.

14. A method according to claim 9, wherein each of the plurality of communication conference apparatuses has a setting step for setting the direction of communication between said each apparatus and each of the other communication conference apparatuses participating in the communication conference.

15. A method according to claim 9, further comprising the step of displaying plural data corresponding to the participants of the communication conference.

16. A communication conference method comprising the steps of:

disposing a plurality of connected communication conference apparatuses;

setting a direction of communication between the plurality of communication conference apparatuses participating in a communication conference, said setting step setting said direction at any time during the communication conference; and connecting communication lines in accordance with the direction of communication set in said setting step.

17. A computer readable storage medium for storing a computer program which causes a computer to perform the steps of:

setting a direction of communication between one apparatus and each of other communication conference apparatuses participating in a communication conference, the setting step setting the direction at any time during the communication conference; and connecting communication lines among the plurality of communication conference apparatuses in accordance with the direction of communication set in said setting step.

18. A medium according to claim 17, wherein the direction of communication is one of uni-directional transmission only, uni-directional reception only, and bi-directional communication.

19. A medium according to claim 17, wherein the program causes the computer to perform the further step of displaying the other communication conference apparatuses participating in the communication conference.

20. A medium according to claim 19, wherein the program causes the setting step to be displayed in the display step.

21. A medium according to claim 17, wherein the communication conference communicates at least voice and image information.

22. A medium according to claim 17, wherein the program causes each of the plurality of communication conference apparatuses to have a setting step for setting the direction of communication between said each apparatus and each of the other communication conference apparatuses participating in the communication conference.

23. A medium according to claim 17, wherein the program causes the computer to perform the further step of displaying plural data corresponding to the participants of the communication conference.

24. A computer readable storage medium for storing a computer program which causes a computer to perform the steps of:

setting a direction of communication between a plurality of communication conference apparatuses participating in a communication conference, said setting step setting said direction at any time during the communication conference; and connecting communication lines in accordance with the direction of communication set in said setting step.

* * * * *

UNITED STATES PATENT AND TRADEMARK OFFICE
CERTIFICATE OF CORRECTION

PATENT NO. : 5,909,543

DATED : June 1, 1999

INVENTOR(S) : KENICHIRO TANAKA, ET AL.

Page 1 of 5

It is certified that error appears in the above-identified patent and that said Letters Patent is hereby corrected as shown below:

COVER PAGE AT ITEM [56] OTHER PUBLICATIONS,
Line 5, "Makepeach," should read --Makepeace,--; and
Line 13, "Derwent," should read --Document,--, and "wan." should read --...[close space] www.--, and "msml/" should read --msm/--.

COLUMN 1,
Line 6, "communication" should read --a communication--;
Line 15, "presenter" should read --presentor--;
Line 17, "presenter" should read --presentor--;
Line 20, "presenter" should read --presentor--;
Line 21, "participating" should read --participating in--;
Line 24, "of the" should read --in the--;
Line 44, "to set" should read --setting up--;
Line 58, "black board" should read --blackboard--; and
Line 62, "black board" should read --blackboard--.

COLUMN 2,
Line 12, "numbed" should read --number--;
Line 16, "work" should read --workload--;
Line 19, "of the" should read --in the--;
Line 24, "a reason" should read --stating a reason--;

UNITED STATES PATENT AND TRADEMARK OFFICE
CERTIFICATE OF CORRECTION

PATENT NO. : 5,909,543

DATED : June 1, 1999

INVENTOR(S) : KENICHIRO TANAKA, ET AL.

It is certified that error appears in the above-identified patent and that said Letters Patent is hereby corrected as shown below:

```
COLUMN 2 (Cont.),
Line 25, "come." should read --attend--;
Line 29, "of the" should read --in the--; and
Line 37, "another should read --other--.

COLUMN 3,
Line 26, "type" should read --types--.

COLUMN 5,
Line 8, "starts" should read --start--;
Line 32, "destination,and" should read --destination,
and--;
Line 33, "C," should read --A,--; and
Line 53, "a-step" should read --a step--.

COLUMN 7,
Line 44, "by the pointing" (2nd occurrence) should be
deleted.

COLUMN 9,
Line 27, "presenter" should read --presentor--; and
```

UNITED STATES PATENT AND TRADEMARK OFFICE
CERTIFICATE OF CORRECTION

PATENT NO.　：　5,909,543

DATED　　　：　June 1, 1999

INVENTOR(S):　KENICHIRO TANAKA, ET AL.

It is certified that error appears in the above-identified patent and that said Letters Patent is hereby corrected as shown below:

COLUMN 10,
Line 10, "presenter" should read --presentor--;
Line 44, "presenter" should read --presentor--;
Line 64, "presenter" should read --presentor--; and
Line 67, "or" should be deleted.

COLUMN 11,
Line 18, "whew" should read --when--.

COLUMN 13,
Line 65, "drop-button" should read --drop button--.

COLUMN 14,
Line 11, "participation to" should read --participation in the--.

COLUMN 17,
Line 29, "started," should read --selected--; and
Line 52, "invites" should read --invitee--.

UNITED STATES PATENT AND TRADEMARK OFFICE
CERTIFICATE OF CORRECTION

PATENT NO. : 5,909,543

DATED : June 1, 1999

INVENTOR(S): KENICHIRO TANAKA, ET AL.

It is certified that error appears in the above-identified patent and that said Letters Patent is hereby corrected as shown below:

COLUMN 18,
Line 29, "60n" should read --60n--;
Line 37, "to the" should read --in the--; and
Line 63, "invitees" (1st occurrence) should read --invitors--.

COLUMN 19,
Table, "$0 \leq t \leq n1$" should read --$0 \leq t < n1$--, "$n1 \leq t \leq n2$" should read --$n1 \leq t < n2$--, "$n2 \leq t \leq 3$" should read --$n2 \leq t < n3$--; "$n3 \leq t \leq n4$" should read --$n3 \leq t < n4$--, and "$n4 \leq t \leq n5$" should read --$n4 \leq t < n5$--.

COLUMN 19,
Line 40, 'non-participation" should read --non-participation in--.

COLUMN 21,
Table, "$0 \leq t \leq n1$" should read --$0 \leq t < n1$--, "$n1 \leq t \leq n2$" should read --$n1 \leq t < n2$--, "$n2 \leq t \leq 3$" should read --$n2 \leq t < n3$--; "$n3 \leq t \leq n4$" should read --$n3 \leq t < n4$--, and "$n4 \leq t \leq n5$" should read --$n4 \leq t < n5$--.

UNITED STATES PATENT AND TRADEMARK OFFICE
CERTIFICATE OF CORRECTION

PATENT NO. : 5,909,543
DATED : June 1, 1999
INVENTOR(S) : KENICHIRO TANAKA, ET AL.

It is certified that error appears in the above-identified patent and that said Letters Patent is hereby corrected as shown below:

<u>COLUMN 22</u>,
Line 24, "only" should read --only,--.

<u>FIGURE 6</u>,
"MENUE" should read --MENU--.

<u>FIGURE 21</u>,
"RAGULAR" should read --REGULAR--.

Signed and Sealed this
First Day of February, 2000

Attest:

Attesting Officer

Q. TODD DICKINSON
Acting Commissioner of Patents and Trademarks